United States Patent
Fittz et al.

(10) Patent No.: US 12,534,157 B2
(45) Date of Patent: Jan. 27, 2026

(54) MECHANICALLY INTERLOCKED SPLINE FOR CRANK AND BOTTOM BRACKET INTERFACE OF A MICROMOBILITY VEHICLE

(71) Applicant: Lyft, Inc., San Francisco, CA (US)

(72) Inventors: Casey James Fittz, Oakland, CA (US); Andrew Michael Reimer, San Francisco, CA (US); Neil Richard Anthony Saldanha, San Francisco, CA (US); Joseph Daniel Taylor, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 631 days.

(21) Appl. No.: 18/048,369

(22) Filed: Oct. 20, 2022

(65) Prior Publication Data

US 2024/0132177 A1 Apr. 25, 2024
US 2024/0227973 A9 Jul. 11, 2024

(51) Int. Cl.
*B62K 19/34* (2006.01)
*B62M 3/00* (2006.01)

(52) U.S. Cl.
CPC ............. *B62K 19/34* (2013.01); *B62M 3/003* (2013.01)

(58) Field of Classification Search
CPC ......... B62K 19/34; B62M 3/003; B62M 3/00; B62H 2003/005
See application file for complete search history.

(56) References Cited

U.S. PATENT DOCUMENTS

| | | | | |
|---|---|---|---|---|
| 626,227 A * | 6/1899 | Gaylor | ..... | B62M 3/00 403/287 |
| 5,010,785 A * | 4/1991 | Romero | ..... | B62M 3/00 74/594.1 |
| 6,755,095 B2* | 6/2004 | Yamanaka | ..... | B62M 3/00 74/594.1 |
| 11,505,277 B1* | 11/2022 | Yamanaka | ..... | B62M 3/00 |
| 2005/0040699 A1* | 2/2005 | Chiang | ..... | B62M 3/00 301/124.1 |
| 2011/0011201 A1 | 1/2011 | Kao | | |
| 2012/0048058 A1 | 3/2012 | Kuroiwa | | |

(Continued)

FOREIGN PATENT DOCUMENTS

CN 115009409 A 9/2022
JP H05250056 A 9/1993

OTHER PUBLICATIONS

International search report and Written Opinion received for PCT Application No. PCT/US2023/069471, 11 pages, Oct. 17, 2023.

*Primary Examiner* — Drew J Brown
(74) *Attorney, Agent, or Firm* — Baker Botts L.L.P.

(57) ABSTRACT

A bottom bracket assembly with interconnected axle and crank arms. Each end of the axle has a plurality of angled surfaces and a recess formed with a depth through at least the axle perimeter and at least partially around the perimeter of the axle. Each crank arm has a slot formed a distance along the length such that the end of the crank arm is separated into two deflectable jaws. A bore is formed orthogonal to the slot and a fastener is installed in the bore, wherein the fastener has a length to span the slot in the crank arm to engage both deflectable jaws. The fastener has a shank radius that extends to a depth of the recess. Removal of the crank arm from the axle end is opposed when the fastener is in the bore.

20 Claims, 13 Drawing Sheets

(56) References Cited

U.S. PATENT DOCUMENTS

| | | | |
|---|---|---|---|
| 2013/0085043 A1* | 4/2013 | Cheng | B62M 3/003 |
| | | | 482/61 |
| 2013/0087011 A1 | 4/2013 | Yamanaka | |
| 2014/0157948 A1* | 6/2014 | Onogi | B62J 45/421 |
| | | | 74/594.1 |
| 2019/0308689 A1* | 10/2019 | Kitahara | B62M 3/003 |

* cited by examiner

MECHANICALLY INTERLOCKED SPLINE FOR CRANK AND BOTTOM BRACKET INTERFACE OF A MICROMOBILITY VEHICLE

TECHNICAL FIELD

This disclosure relates generally to drivetrains, and more particularly to bottom bracket assemblies for micromobility vehicles, such as bicycles.

BACKGROUND

Transportation services may provide transportation on demand, drawing from a transportation supply pool that includes vehicles of multiple types to meet the needs of those requesting transportation as such needs arise. Some transportation services may include personal mobility vehicles including, but not limited to, shareable or rentable bicycles and scooters in a dynamic transportation network in order to enable users to complete portions of a journey more efficiently. Such personal mobility vehicles provide an additional dimension of transportation flexibility.

SUMMARY

Bicycles and other pedal-powered systems allow a user to generate rotational power to propel the micromobility vehicle. In a bicycle, a bottom bracket assembly generally comprises a pair of crank arms (also referred to simply as "cranks") coupled to an axle. The bottom bracket assembly may be further coupled to a front gear, wherein the front gear is coupled to a rear gear (which may form part of a rear cassette) via chain. A user propels the bicycle by pedaling the pair of crank arms around the axle, wherein the front gear, chain and rear gear transmit the power to a rear wheel.

The crank arms may be coupled to an axle using various approaches. An approach involves positioning crank arms on an axle having a threaded bore on each end and advancing and torquing the hardware in the threaded bore to secure the cranks arms to the axle. Another approach involves press fitting the crank arms onto an axle, wherein each crank arm may have an opening formed slightly smaller than a profile of an end of the axle and each crank arm is press fit onto the axle to cause deformation of the material in the crank arms. For example, each crank arm may have a square opening and the ends of an axle may have a square profile (e.g., a perimeter of the ends of the axle may comprise four surfaces), which may include a tapered square profile (e.g., the ends of the axle may have a square profile but be tapered along a longitudinal axis). Another approach involves the crank arms having a substantially circular opening with internal splines for positioning on an axle with a substantially circular outer surface with a plurality of external splines, wherein the axle may have a threaded bore and hardware (e.g., a threaded bolt) may be advanced into the threaded bore and torqued to secure the crank arms to the axle.

An issue with some bottom bracket assembly is that a crank arm can loosen. If a crank arm loosens, one possible effect is that the crank arms do not engage the axle properly. For example, internal splines on the crank arm might not engage external splines on the axle, causing either set of splines to wear until the two sets of splines do not transfer power. Another possible effect is that a crank arm may possibly withdraw (e.g., fall off) from the axle. In either case, the loosening of the coupling could result in a user being unable to pedal to propel the bicycle.

In some cases, the crank arms may be coupled to an axle with hardware torqued to a certain value. If the hardware is not torqued correctly or the torque is compromised, continued use may cause the hardware to loosen, including withdrawing from (e.g., falling off) the axle.

In some cases, the crank arms may be press fit onto an axle. In these cases, a user may inadvertently cause contact to a pedal coupled to a crank arm, such as by accidentally dropping a bicycle on its side. In bottom bracket assembly in which the crank arms are coupled to an axle with a press fitting, if the contact results in a large contact force to the press fitting, the contact force may cause unintended deformation of the crank arm material such that the press fitting is compromised. If the press fitting is compromised, the bicycle may be unusable for transporting a user. In some cases, the crank arms and the axle have splines and the crank arms are secured with hardware. In these cases, if the hardware torque is compromised, the hardware may loosen (as mentioned above) such that the splines do not fully engage, wherein the crank arm may rotate around the axle but the user is unable to propel the bicycle.

In all of these cases and others, a bicycle may be rendered unusable based on one single point of failure. For example, once a torque is compromised, the hardware may loosen and continued pedaling continues to loosen the coupling between the crank arms and the axle. In some cases, as the coupling loosens, the crank arms might not transfer power to the axle. In some cases, continued pedaling by the user may cause the affected crank arm to withdraw from (e.g., fall off) the axle. Even if a user is able to reposition a crank arm or hardware on an axle, the user may not have the tools or time to secure the crank arms to the axle and continued pedaling may cause the crank arm to withdraw again.

Embodiments may be generally directed to a bottom bracket assembly with an axle interconnected with a crank arm and a fastener, wherein the interconnection opposes withdrawal of the crank arm from the axle. The axle is rotatable around a longitudinal axis and comprises an axle outer surface comprising a plurality of angled surfaces defining an axle perimeter and a recess formed with a depth through at least a portion of the axle perimeter and at least partially around the axle perimeter. The bottom bracket assembly further comprises a crank arm with a first end for coupling to the axle, the crank arm comprising an axle opening formed a distance along a length of the crank arm, the axle opening comprising a base surface defining an axle opening base perimeter greater than the axle perimeter. The crank arm further comprises a bore formed orthogonal to the axle opening, the bore having a radius sized for intersecting at least the axle opening base perimeter, and a fastener comprising a head and a shank with a shank radius less than a radius of the bore, wherein the shank radius is less than the depth of the radius of the bore. The bore is aligned with the recess when the crank arm is positioned on the axle, and at least a portion of the shank radius is positioned inward of the axle perimeter when the fastener is positioned in the bore. The plurality of angled surfaces may comprise a plurality of external splines extending radially outward from the axle outer surface, the plurality of external splines defining an axle major radius. The internal surface may define an axle opening major diameter and further comprise a plurality of internal splines extending radially inward from the internal surface for engaging the plurality of external splines, wherein the plurality of internal splines define an axle opening minor diameter less than the axle major radius.

In some embodiments, the bottom bracket assembly further comprises a slot formed a second distance along the length of the crank arm and joined with the axle opening, wherein the slot and the axle opening divide the first end of the crank arm into a first deflectable jaw and a second deflectable jaw, and the bore comprises a first portion formed in the first deflectable jaw and a second portion formed in the second deflectable jaw. The shank of the fastener may have a shank length longer than the slot between the first deflectable jaw and the second deflectable jaw, wherein advancement of the fastener in the bore narrows the slot between the first deflectable jaw and the second deflectable jaw to increase engagement of the plurality of angled surfaces by the internal surface to resist withdrawal of the crank arm from the axle.

In some embodiments, the shank of the fastener comprises threads and the second portion of the bore comprises threads, wherein engagement of the threads in the second portion of the bore by the threads on the shank resists withdrawal of the fastener from the crank arm, wherein advancement of the threads on the shank in the second portion of the bore narrows the slot between the first deflectable jaw and the second deflectable jaw to resist withdrawal of the crank arm from the axle.

In some embodiments, the shank of the fastener comprises threads and the fastener further comprises a threaded nut, wherein engagement of the threaded nut by the threads on the shank resists withdrawal of the fastener from the crank arm; and advancement of the threads on the shank in the threaded nut narrows the slot between the first deflectable jaw and the second deflectable jaw to further resist withdrawal of the crank arm from the axle.

In some embodiments, the plurality of angled surface comprises a plurality of external splines, the plurality of external splines defines an axle major radius, an axle minor radius and an axle pitch radius, the axle opening base surface comprises a plurality of internal splines extending radially inward from the axle opening base surface for engaging the plurality of external splines, and the plurality of internal splines define an axle opening major radius, an axle opening minor radius and an axle opening pitch radius, wherein each of the axle opening major radius, the axle opening minor radius and the axle opening pitch radius is less than the axle major radius and the recess is formed with a depth through at least the axle major radius.

In some embodiments, the plurality of internal splines defines an axle opening minor radius greater than the axle minor radius and the recess is formed with a depth through the axle pitch radius, wherein advancement of the threads on the shank in the threaded nut narrows the slot between the first deflectable jaw and the second deflectable jaw to engage the plurality of internal splines with the plurality of external splines to further resist withdrawal of the crank arm from the axle.

In some embodiments, the plurality of internal splines defines an axle opening minor radius greater than the axle pitch radius and the recess is formed with a depth through the axle major radius, wherein advancement of the threads on the shank in the threaded nut narrows the slot between the first deflectable jaw and the second deflectable jaw to engage the plurality of internal splines with the plurality of external splines to further resist withdrawal of the crank arm from the axle.

In some embodiments, the bottom bracket assembly further comprises a secondary fastener with a threaded shank. Each end of the axle may comprise a longitudinal bore formed along at least a portion of the longitudinal axis wherein the longitudinal bore comprises threads and engagement of the threads of the longitudinal bore by the threaded shank of the secondary fastener resists withdrawal of the crank arm from the axle.

In some embodiments, the bottom bracket assembly further comprises a through-bore formed in the axle along the longitudinal axis from a first end of the axle to a second end of the axle, a through-bolt configured for inserting in the through-bore, the through-bolt having a head on a first end of the through-bolt and threads on a second end of the through-bolt, and an axle nut having internal threads for engaging the threads on the second end of the through-bolt, wherein engagement of the threads on the axle nut with the threads on the second end of the through-bolt further resists withdrawal of the crank arm from the axle.

In some embodiments, the recess is curved and has a recess radius of curvature, wherein the shank radius is smaller than the recess radius of curvature.

BRIEF DESCRIPTION OF THE DRAWINGS

For a more complete understanding of the present disclosure and its features and advantages, reference is now made to the following description, taken in conjunction with the accompanying drawings, which are not drawn to scale, and in which.

DETAILED DESCRIPTION

In accordance with various embodiments of the present disclosure, systems and methods provide a micromobility vehicle that can be propelled by a user pedaling. A micromobility vehicle may be a single-user (or double-user) vehicle such as a bicycle or a scooter designed for traveling in short distances (e.g., less than 5 miles, less than 10 miles, etc.) relative to conventional shared vehicles, such as cars. The micromobility vehicle may include at least two wheels, a drivetrain (e.g., a front gear, chain and rear gear or cassette) for mobilizing the micromobility vehicle (e.g., for mobilizing at least one of the wheels), a handle bar for steering the micromobility vehicle, and a frame that includes at least a head tube for supporting the handle bar, a seat tube for supporting a saddle (e.g., a seat), and a down tube that connects the head tube and the seat tube. A front gear may include one or more front gears and a rear gear or rear cassette may include one or more gears. A user may pedal a bicycle by placing their feet on two pedals coupled to a pair of crank arms and causing the crank arms to rotate around an axle.

Figure 1:
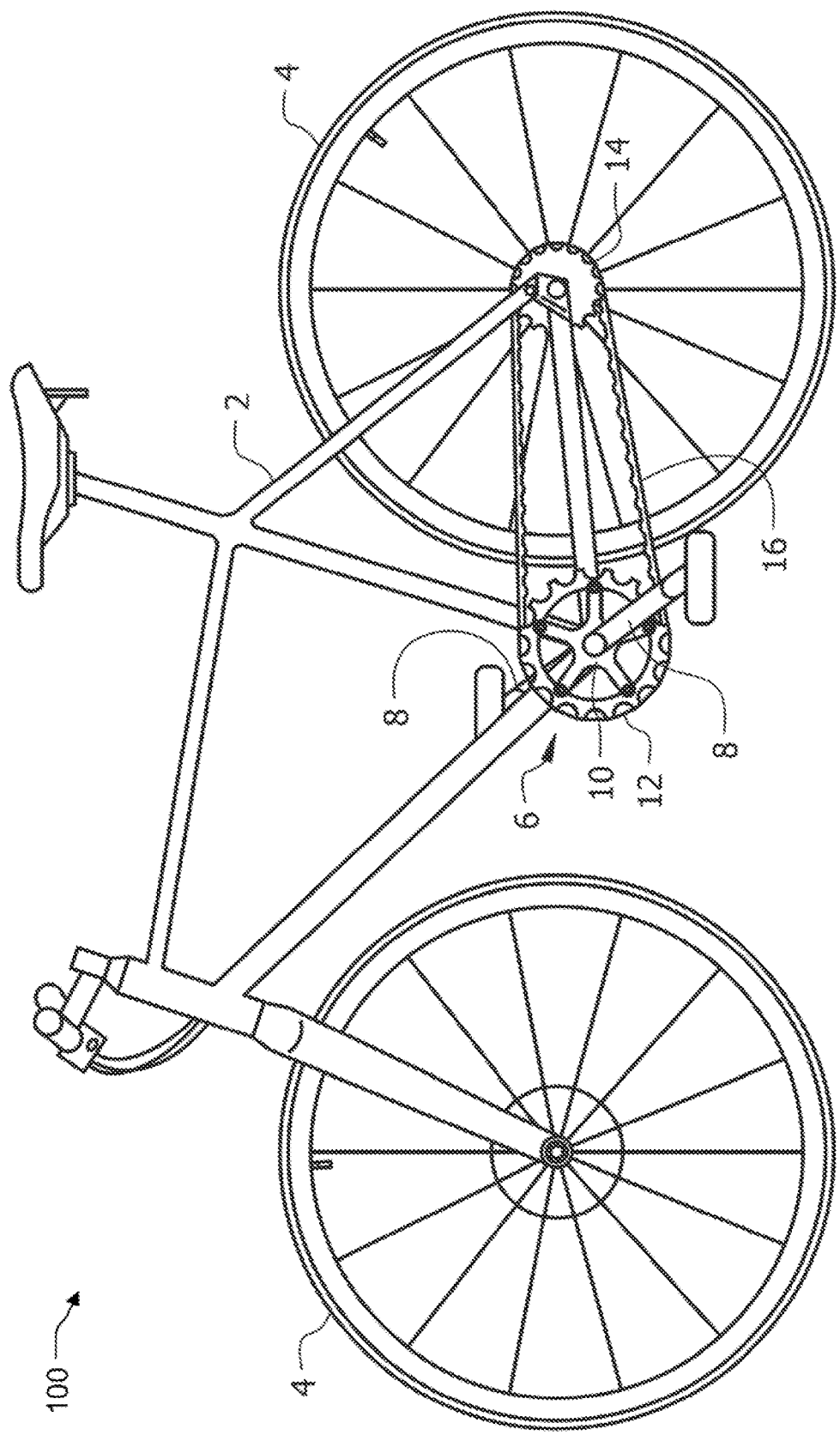
FIG. 1 depicts a perspective view of a bicycle as an example micromobility vehicle, with an example bottom bracket assembly connected to a crank arm.

Turning to the drawings, FIG. 1 depicts a side view of bicycle 100 as one type of a micromobility vehicle that may benefit from a mechanically interconnected spline for a crank and bottom bracket interface. Bicycle 100 comprises frame 2, a set of wheels 4 rotatably coupled to frame 2, bottom bracket assembly 6 positioned in frame 2 and a pair of crank arms 8 coupled to axle 10 in bottom bracket assembly 6. Bicycle 100 may further include one or more gears 12 coupled to axle 10, rear cassette 14 coupled to a wheel 4 in the set of wheels 4 and transmission member 16 coupled to the one or more gears 12 and rear cassette 14. In some embodiments, transmission member 16 comprises a chain as depicted in FIG. 1 but may comprise a shaft or other type of transmission member 16 for transmitting power from bottom bracket assembly 6 to the one or more wheels 4. In some embodiments, the transmission member 16 may be a mechanical gear or an automatic transmission or other type of transmission coupled to a motor. In some embodiments, the bicycles described herein, e.g., bicycle 100 illustrated in FIG. 1, may be a motorized bicycle with an integrated electric motor.

A plurality of bicycles 100 may be available for use by multiple users, such as in a bikeshare program. A user may visit a location and select bicycle 100 from a plurality of other micromobility vehicles. In particular, each bicycle 100 may be rented by different users over a single day. Each user may want to use the bicycle 100 to travel to destinations across different road conditions that may subject each of the bicycles 100 to different amounts of physical wear. For example, one rider may want to use the bicycle to travel across a smoothly paved road in a downtown area. However, another ride may want to use the same bicycle to travel across an area that is under construction where the road is uneven and has numerous potholes. Additionally, because the users are renting the bicycles 100 for a short period of time, they may be less considerate about avoiding damage to the bicycles 100. However, any damage to the components of the bicycle, including the bottom bracket assembly 6, can lead to significant downtime required to repair the bicycle that renders it unable to be rented out; thereby, affecting the utilization of the bicycle 100 for the bikeshare program.

An issue with the bottom bracket assembly 6 involves the crank arms 8 withdrawing from axle 10. For example, a user accidentally dropping a bicycle on its side may cause contact with a pedal (not shown) connected to the crank arm 8 to impart a force, causing the crank arm to decouple from the bicycle 100, thereby causing a user to be unable to use the pedal to propel bicycle 100. In some cases, crank arm 8 may be coupled to axle 10 with hardware torqued to a certain value. In these cases, continued pedaling over time may cause the hardware to loosen, allowing the crank arm 8 to fall off the axle 10. In some cases, crank arm 8 is press fit onto axle 10. In these cases, a user may inadvertently cause contact to a crank arm 8, such as by accidentally dropping bicycle 100 on its side (as mentioned above) or by hitting a stationary object with the pedal when riding. In bottom bracket assembly 6 in which crank arm 8 is coupled to axle 10 with a press fitting, if the contact results in a large contact force to the press fitting, the contact force may cause unintended deformation of the crank arm material such that the press fitting is compromised. If crank arm 8 is coupled to axle 10 with a press fitting, continued pedaling by the user may cause the affected crank arm 8 to withdraw from the axle 10. In some cases, crank arm 8 and/or axle 10 has splines and may be secured with hardware. In these cases, if the hardware torque is compromised (also referred to as "broken"), the hardware may be able to loosen and withdraw from axle 10. If the hardware is withdrawn from axle 10, continued pedaling by the user may cause the affected crank arm 8 to withdraw from the axle 10, resulting in bicycle 100 being unusable. Even if a crank arm 8 is repositioned on axle 10, continued pedaling may cause it to withdraw again.

To overcome the deficiencies of bottom bracket assembly 6 and provide a better overall experience for users of bicycles 100 and similar micromobility vehicles, embodiments may include a mechanically interconnected bottom bracket assembly, wherein a positioning of components to cause resistance and/or interference between each crank arm and an axle may resist or significantly prevent loosening or withdrawal of the crank arm from the axle. Furthermore, embodiments may provide redundant security to avoid a failure of a single component causing an unusable bicycle.

Figure 2:
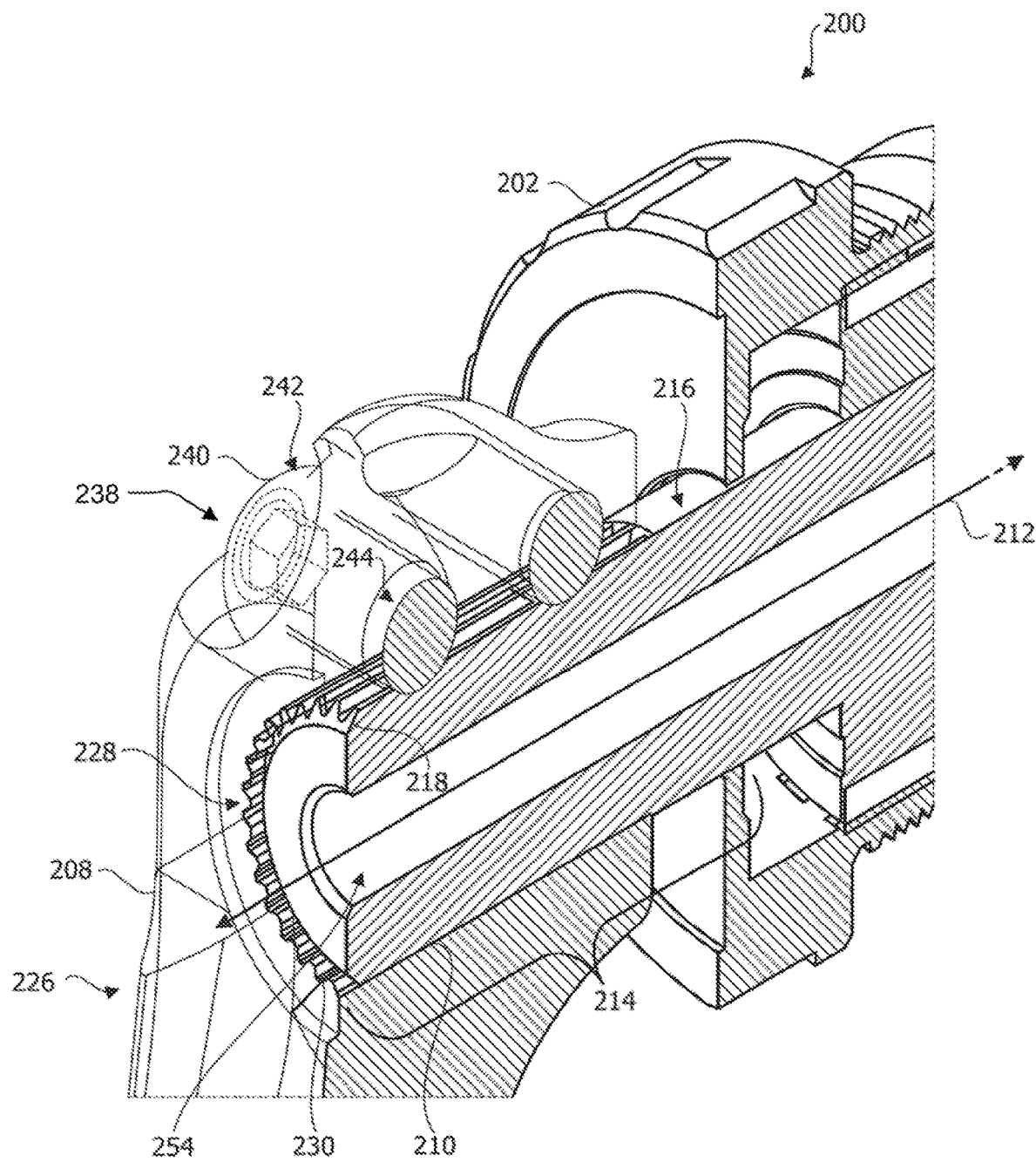
FIG. 2 depicts a perspective cutaway view of an interlocked bottom bracket axle assembly, according to one or more embodiments.

FIG. 2 depicts a portion of one embodiment of interconnected bottom bracket assembly 200 that may be utilized in the bicycles 100 that include pedals, the bottom bracket assembly 200 comprising axle 210 rotatable around a longitudinal axis 212 between the ends of axle 210, crank arm 208 and at least one bore 238 for receiving a fastener 240, wherein two or more of axle 210, crank arms 208 and fastener 240 may be mechanically interconnected to resist or prevent crank arms 208 loosening and/or withdrawing from bottom bracket assembly 200.

Figure 3:
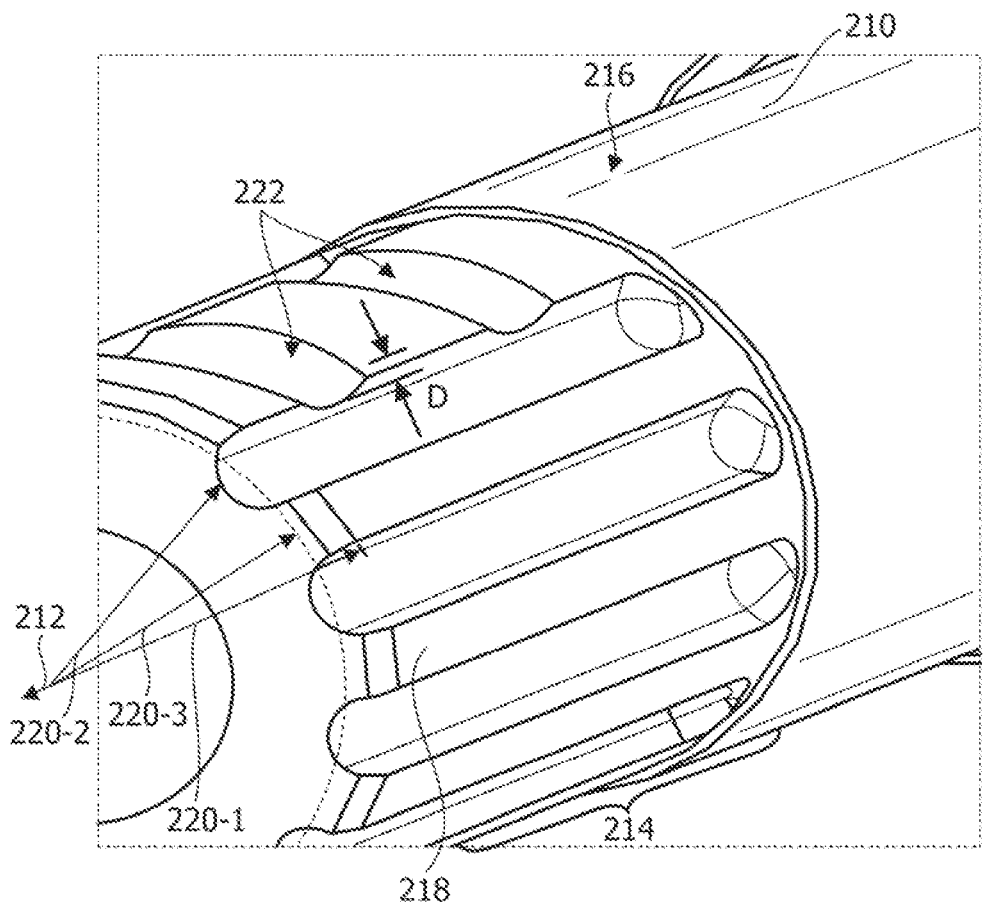
FIG. 3 depicts a perspective close-up view of an axle end for an interlocked bottom bracket axle assembly, according to one or more embodiments.

Bottom bracket assembly 200 may be supported in a frame (such as frame 2 in FIG. 1) by bearings 202. Axle 210 has two axle ends 214 (only one axle end 214 is shown in FIG. 2). Each axle end 214 has an axle outer surface 216 comprising a plurality of angled surfaces. A plurality of angled surfaces may provide more contact points to distribute torques applied by a user pedaling bicycle 100. In some embodiments, each axle end 214 is formed with a square outer surface profile (not shown), wherein the plurality of angled surfaces comprises four surfaces and the plurality of angled surfaces define an axle perimeter. The number and type of angled surfaces may vary. For example, as depicted in FIG. 2, in some embodiments, the plurality of angle surfaces comprises a plurality of external splines 218 extending radially outward, wherein the plurality of external splines 218 may define an axle major radius 220-1, an axle minor radius 220-2 and an axle pitch radius 220-3, as depicted in FIG. 3. Embodiments disclosed herein are described based on the plurality of angled surfaces comprising a plurality of external splines 218 but may apply to embodiments in which axle 210 comprises other angled surfaces.

Each crank arm 208 comprises a first end 226 for coupling to an axle end 214. First end 226 of each crank arm 208 comprises axle opening 228 formed a distance along a length of crank arm 208. Axle opening 228 may comprise a plurality of internal splines 230 extending radially inward for engaging the plurality of external splines 218 of axle end 214, discussed in greater detail below. Axle 210 may be solid or may have longitudinal bore 254 formed along longitudinal axis 212, discussed in greater detail below.

Referring to FIGS. 2 and 3, for embodiments with a plurality of external splines 218 formed in axle outer surface 216, axle outer surface 216 may define an axle major radius 220-1. In some embodiments, the plurality of external splines 218 may define an axle major radius 220-1. In some embodiments, a base surface of the plurality of external splines 218 may define an axle minor radius 220-2. In some embodiments, the plurality of external splines 218 may further define an axle pitch radius 220-3.

Embodiments may be configured to resist or prevent crank arm 208 from withdrawing from axle 210. In some embodiments, each axle end 214 further includes at least one recess 222 formed with a depth D through at least a portion of the axle perimeter, wherein recess 222 may be aligned with a bore 238 to position at least a portion of a fastener 240 to resist or prevent crank arm 208 from withdrawing from axle 210. For embodiments with external splines 218 formed in axle outer surface 216, at least one recess 222 may be formed with a depth D through axle major radius 220-1 but may be formed with depth D through axle pitch radius 220-3 or axle minor radius 220-2, or anywhere in between. The at least one recess 222 may be formed in at least a portion of a perimeter (e.g., an arclength) of axle end 214 having a generally circular profile (as depicted in FIG. 3) or may be formed fully around the perimeter of axle end 214 (not shown). In some embodiments (not shown) in which axle 210 comprises a square (or tapered square) profile, recess 222 may be formed in at least a portion of the axle perimeter, such as in one side, two sides or three sides or may be formed completely around the axle perimeter (e.g., all four sides) of axle 210. One or more of the depth D of recess 222 and the arclength or number of sides that recess 222 is formed in at least a portion of the perimeter of axle end 214 may be based on hardware used to secure crank arm 208 to axle end 214, discussed in greater detail below. The at least one recess 222 may be formed as a curved surface as depicted in FIG. 3 (with a radius of curvature approximately equal to a radius of a bore 238), or may be formed with angled sides (not shown).

Referring to one or more of FIGS. 2 and 4-7, crank arm 208 may comprise a first end 226 with axle opening 228 formed a distance along a length of crank arm 224. Axle opening 228 for positioning crank arm 208 on axle 210 having a plurality of external splines 218 may comprise a plurality of internal splines 230 extending radially inward for engaging the plurality of external splines 218 of axle end 214.

Figure 5:
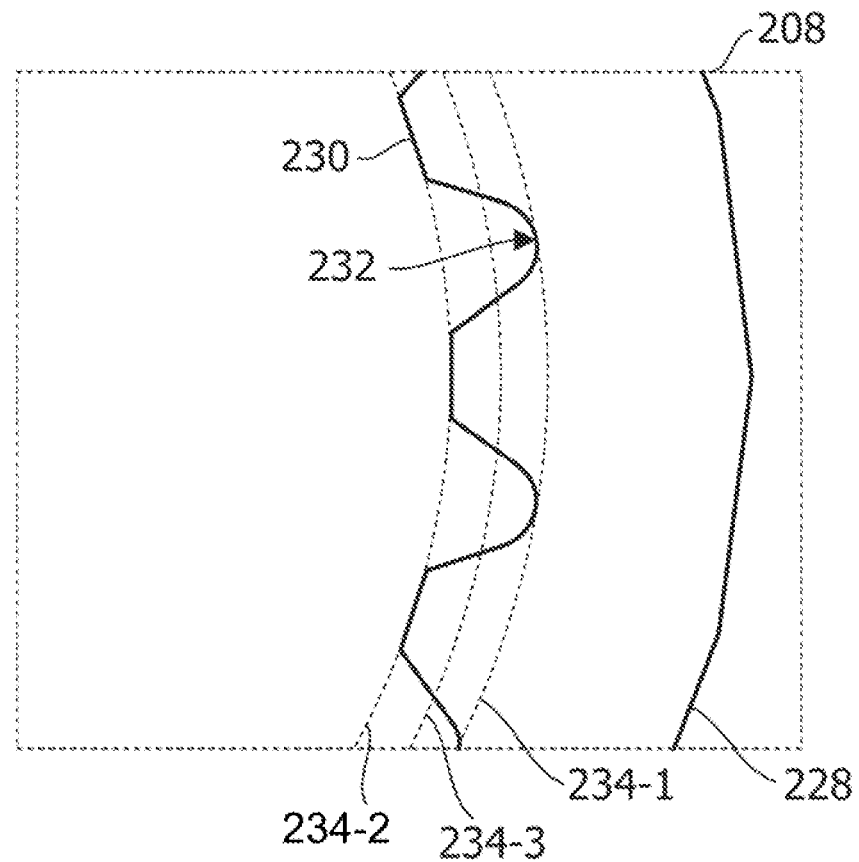
FIG. 5 depicts a partial end view of an axle end for an interlocked bottom bracket axle assembly, according to one or more embodiments.

Referring to FIGS. 2 and 5, axle opening 228 in crank arm 208 may be formed with base surface 232 defining an axle opening major radius 234-1. The plurality of internal splines 230 may extend radially inward from base surface 232 to define an axle opening minor radius 234-2 and the plurality of internal splines 230 may further define an axle opening pitch radius 234-3.

Figure 6:
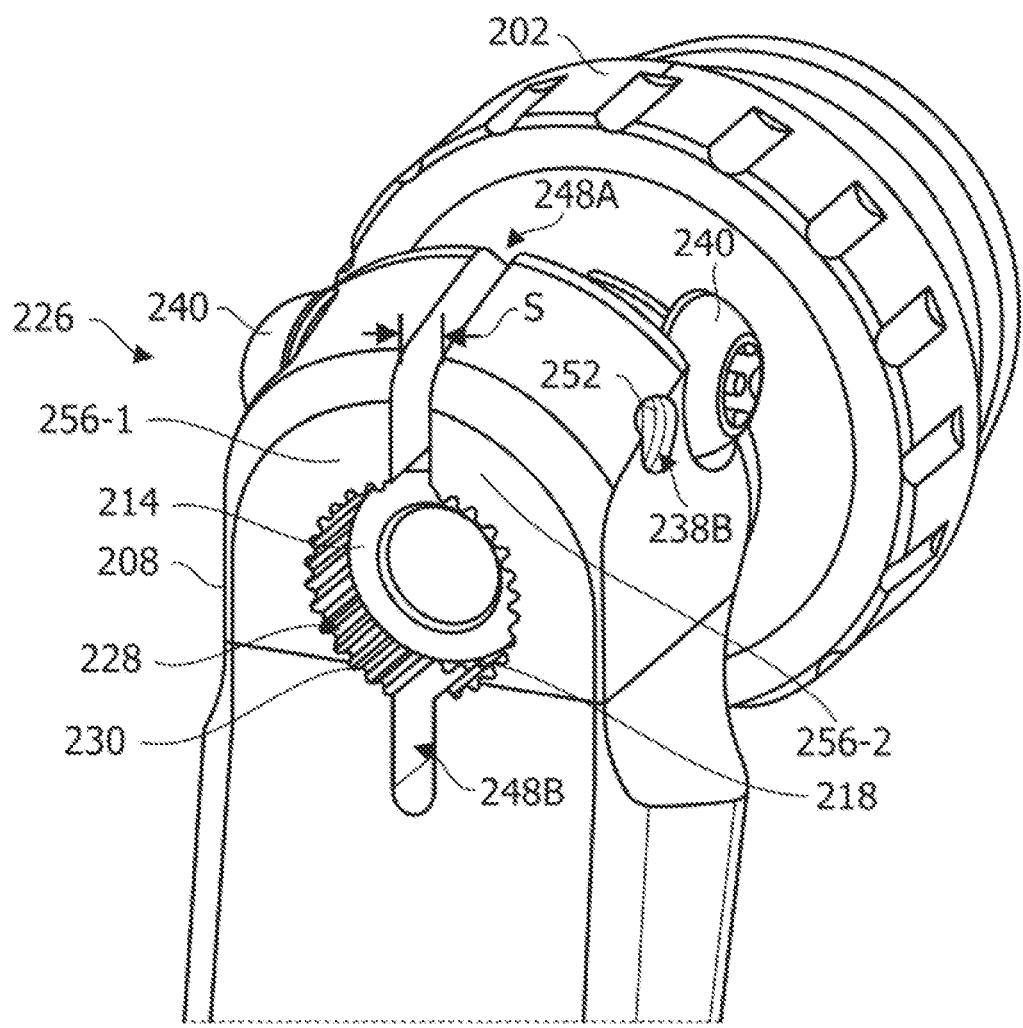
FIG. 6 depicts a perspective view of an interlocked bottom bracket axle assembly, according to one or more embodiments.
Figure 7:
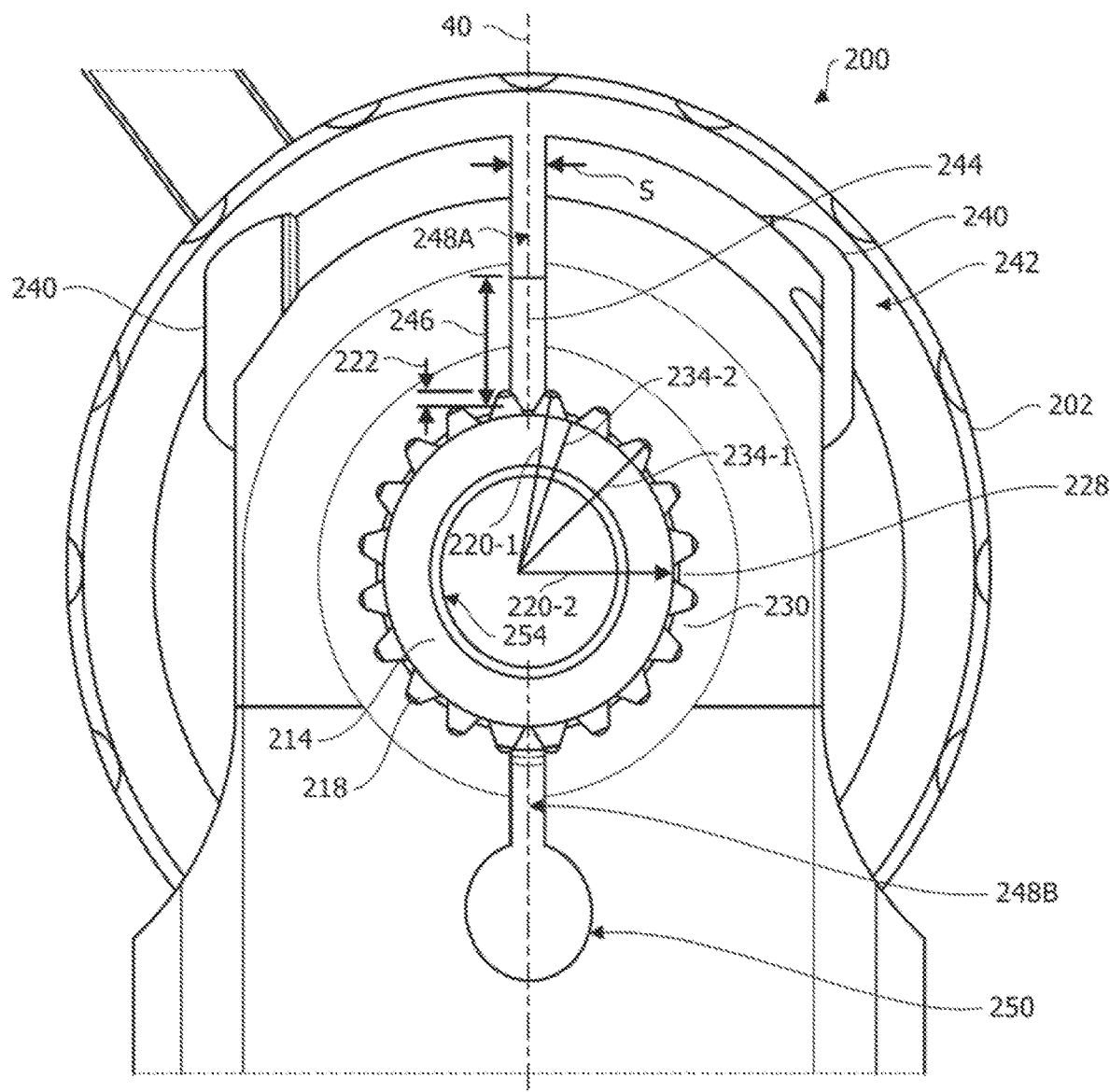
FIG. 7 depicts an end view of an interlocked bottom bracket axle assembly, according to one or more embodiments.

Referring to FIGS. 2, 6 and 7, fastener 240 comprises head 242 and shank 244. Shank 244 may have a shank radius less than a radius of bore 238 to allow shank 242 to be advanced into bore 238. In some embodiments, a portion of shank 244 comprises threads and second portion 238B of bore 238 comprises threads 252, wherein advancement of threaded shank 244 through threaded bore 238 engages threaded shank 244 with threads 252. When fastener 240 is in bore 238, a portion of the radius of fastener 240 is positioned in recess 222, wherein fastener 240 positioned in recess 222 resists or prevents withdrawal of crank arm 208 from axle 210. In some embodiments, shank 244 with threads engaging threads 252 in bore 238 positions at least a portion of shank 244 in recess 222 such that withdrawal of fastener 240 from crank arm 208 is necessary to withdraw crank arm 208 from axle 210.

Each crank arm 208 further comprises at least one bore 238 formed at an angle (e.g., orthogonal) to axle opening 228 for positioning at least a portion of fastener 240 inward of the axle perimeter to resist or prevent withdrawal of crank arm 208 from axle 210.

As depicted in one or more of FIGS. 2, 4, 6 and 7, in some embodiments, crank arm 208 may comprise two or more bores 238, wherein a first bore 238 may be oriented in a first direction and a second bore 238 may be oriented in a second direction opposite the first direction.

Figure 4:
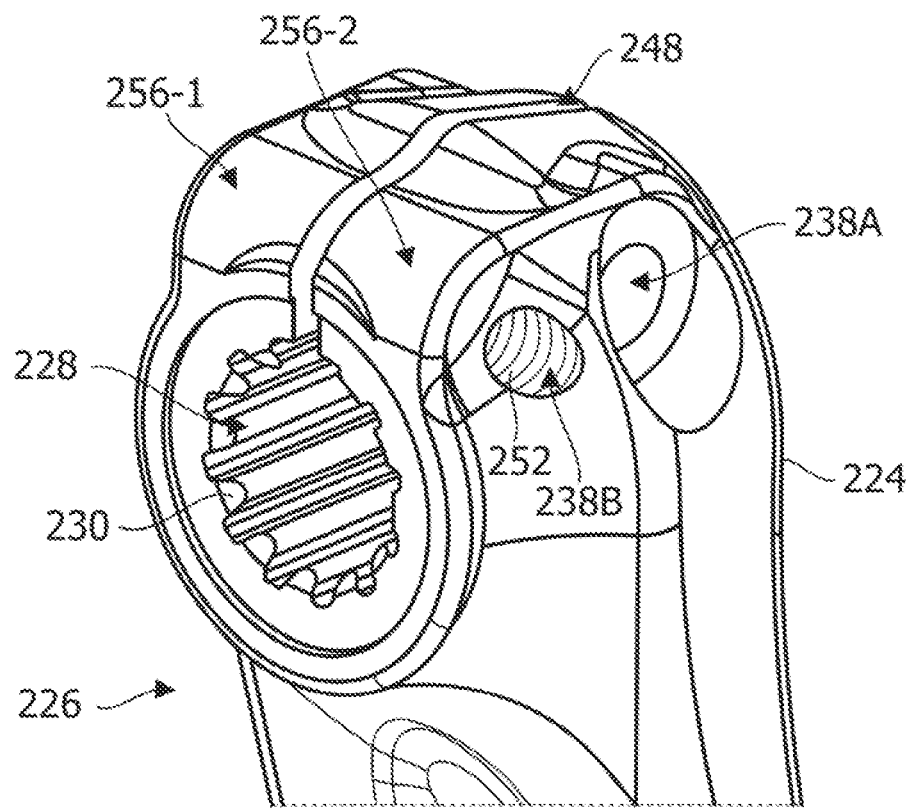
FIG. 4 depicts a perspective partial view of a crank arm for an interlocked bottom bracket axle assembly, according to one or more embodiments.

Embodiments may further be configured to resist or prevent withdrawal of crank arms 208 from axle 210 and may increase engagement between crank arm 208 and axle 210. In some embodiments, crank arm 208 may comprise slot 248 dividing first end 226 of each crank arm 208 into a first deflectable jaw 256-1 and a second deflectable jaw 256-2, wherein slot 248 separates first deflectable jaw 256-1 from second deflectable jaw 256-2 by a distance S. The distance S and/or a length of slot 248 may determine how much each deflectable jaw 256 may be deflected, which may determine how much the plurality of internal splines 230 can engage with the plurality of external splines 218. In some embodiments, slot 248 and axle opening 228 may be joined to divide first end 226 into first deflectable jaw 256-1 and second deflectable jaw 256-2. As depicted in FIG. 4, slot 248 may be formed in union with axle opening 228. As depicted in FIG. 6, slot 248 may comprise first portion 248A and second portion 248B on either side of axle opening 228, wherein first portion 248A and second portion 248B of slot 248 and axle opening 228 divide first end 226 into first deflectable jaw 256-1 and second deflectable jaw 256-2. As depicted in FIG. 7, slot 248 may comprise first portion 248A and second portion 248B on either side of axle opening 28 and may further include or be in union with slot relief 250, wherein first portion 248A and second portion 248B of slot 248, axle opening 228 and slot relief 250 may divide first end 226 into first deflectable jaw 256-1 and second deflectable jaw 256-2. As depicted in FIGS. 4, 6 and 7, slot 248 may be formed generally aligned with a longitudinal axis 40 of crank arm 208. In some embodiments, slot 248 may be formed at an angle relative to longitudinal axis 40 of crank arm 208.

In some embodiments, to increase engagement of a plurality of internal splines 230 with a plurality of external splines 218, first deflectable jaw 256-1 and second deflectable jaw 256-2 may be deflected towards each other to narrow slot 248. For example, each crank arm 208 may have at least one bore 238 for receiving fastener 240 and positioning at least a portion of a radius of fastener 240 within recess 222. In some embodiments, bore 238 may be formed orthogonal to and intersecting at least a portion of axle opening 228. A first portion 238A of bore 238 may be formed in first deflectable jaw 256-1 and a second portion 238B of bore 238 may be formed in second deflectable jaw 256-2. As depicted in one or more of FIGS. 2, 4, 6 and 7, in some embodiments, each crank arm 208 may comprise a plurality of bores 238 for receiving a plurality of fasteners 240, wherein a first fastener 240 may be positioned in a first bore 238 oriented in a first direction and a second fastener 240 may be positioned in a second bore 238 oriented in a second direction opposite the first direction. Second portion 238B of one or more bores 238 may have threads 252 for further engagement by fastener 240.

Further advancement of threaded shank 244 in threaded bore 238 may apply a force to one or more of first deflectable jaw 256-1 and second deflectable jaw 256-2 to reduce the distance S between first deflectable jaw 256-1 and second deflectable jaw 256-2, effectively reducing the dimensions of axle opening 228. For example, rotation of fastener 240 with shank 244 having threads engaged with threads in second portion 238B may effectively reduce axle opening major radius 234-1, axle opening minor radius 234-2, and axle opening pitch radius 234-3. In some embodiments, bore 238 is not threaded but shank 244 comprises threads and fastener 240 further comprises a nut (not shown) with threads 252, wherein threaded shank 244 may be advanced through bore 238 to engage fastener threads with threads 252 on the nut and rotation of threaded shank 244 in the threaded nut applies a force to one or more of first deflectable jaw 256-1 and second deflectable jaw 256-2 to close the distance between first deflectable jaw 256-1 and second deflectable jaw 256-2, effectively reducing axle opening major radius 234-1, axle opening minor radius 234-2, and axle opening pitch radius 234-3. Reducing the axle opening major radius 234-1, axle opening minor radius 234-2 and axle opening pitch radius 234-3 provides greater engagement of the plurality of internal splines 230 with the plurality of external splines 218 for more secure coupling of crank arm 208 to axle end 214. In some embodiments, material for crank arms 208 may be selected such that deflection of first deflectable jaw 256-1 and second deflectable jaw 256-2 may be elastic, wherein first deflectable jaw 256-1 and second deflectable jaw 256-2 may return to an original configuration if the one or more fasteners 240 are removed. In some embodiments, material for crank arms 208 may be selected such that deflection of first deflectable jaw 256-1 and second deflectable jaw 256-2 may be inelastic, wherein first deflectable jaw 256-1 and second deflectable jaw 256-2 are maintained in a deflected configuration even if the one or more fasteners 240 are removed.

A first portion 238A of bore 238 may be in first deflectable jaw 256-1 and a second portion 238B of bore 238 may be in second deflectable jaw 256-2. As depicted in FIG. 2, a first portion 238A of a bore 238 may be unthreaded and a second portion 238B of a bore 238 may have threads 252.

As mentioned above, fastener 240 may be positioned in bore 238 such that at least a portion of the shank radius is positioned inward of the perimeter of axle 210. Referring to FIGS. 2, 4, 6 and 7, in some embodiments, the at least one bore 238 may be formed a distance from an end of crank arm 208 for intersecting at least the axle opening major radius 234-1. In some embodiments, the at least one bore 238 may be formed a distance from an end of crank arm 208 for intersecting the axle opening pitch radius 234-3. In some embodiments, the at least one bore 238 may be formed a distance from an end of crank arm 208 for intersecting the axle opening minor radius 234-2.

The components of bottom bracket assembly 200 may be assembled to interconnect crank arms 208 to axle 210 and to resist or prevent crank arms 208 from withdrawing from axle 210.

Prior to assembly, crank arm 208 may be in a first configuration, wherein slot 248 dividing crank arm 208 into first deflectable jaw 256-1 from second deflectable jaw 256-2 separates first deflectable jaw 256-1 from second deflectable jaw 256-2 by a distance S corresponding to an undeflected state. In an undeflected state, one or more of axle opening major radius 234-1, axle opening minor radius 234-2, or axle opening pitch radius 234-3 is greater than axle end major radius 220-1, axle end minor radius 220-2, or axle end pitch radius 220-3.

During assembly, crank arm 208 may be positioned on axle end 214, such as by aligning axle opening 228 relative to axle end 214 and advancing crank arm 208 onto axle end 214, wherein the plurality of internal splines 230 is positioned relative to the plurality of external splines 218. When crank arm 208 is positioned on axle end 214 and crank arm 208 is in an undeflected state and hardware 240 is not installed, crank arm 208 may be advanced or withdrawn from axle end 214 to align one or more bores 238 with one or more recesses 222.

When bore 238 is aligned with recess 222, fastener 240 may be positioned in bore 238. Positioning fastener 240 in bore 238 positions a portion of shank 244 in recess 222. In some embodiments, positioning fastener 240 in bore 238 positions a portion of shank 244 inward of axle major radius 220-1. In some embodiments, positioning fastener 240 in bore 238 positions a portion of shank 244 inward of axle end pitch radius 220-3. In some embodiments, positioning fastener 240 in bore 238 positions a portion of shank 244 inward of axle minor radius 220-2. Positioning a radial portion of shank 244 in bore 238 inward of at least axle major radius 220-1 resists or prevents withdrawal of crank arm 208 from axle end 214.

Once fastener 240 is positioned in bore 238, fastener 240 may be advanced to engage fastener threads on shank 244 with bore threads 252 or threads on a nut (not shown) such that fastener 240 resists or prevents withdrawal of fastener 240 from bore 238. When a bottom bracket assembly is assembled with crank arm 208 positioned on axle end 214, fastener 240 is positioned in bore 238 such that at least a portion of shank 244 is positioned in recess 222 inward of at least axle major radius 220-1, and fastener 240 is rotated to engage threads 252 in bore 238 or threads on a nut, withdrawal of crank arms 208 from axle 210 is resisted. Furthermore, if fastener 240 is further rotated relative to threads 252, the distance between first deflectable jaw 256-1 and second deflectable jaw 256-2 may be reduced to reduce tolerances between external splines 218 and internal splines 230, wherein removal of crank arm 208 from axle end 214 is further resisted or prevented. In some embodiments, once fastener 240 is positioned in bore 238 with at least a portion of shank 244 positioned in recess 222 inward of axle major radius 220-1 and advanced to engage threads 252, removal of crank arm 208 from axle end 214 may be possible only after disengaging threads on fastener 240 from threads 252 and removing fastener 240 from bore 238.

In some embodiments, once threads on shank 244 are engaged with threads 252 in bore 238 or on a nut), first deflectable jaw 256-1 and second deflectable jaw 256-2 may be deflected toward each other to reduce the distance S between first deflectable jaw 256-1 and second deflectable jaw 256-2. In some embodiments, rotation of fastener 240 with threads on shank 244 engaged with threads 252 in bore 238 or a nut deflects one or more of first deflectable jaw 256-1 and second deflectable jaw 256-2 to reduce the distance between first deflectable jaw 256-1 and second deflectable jaw 256-2. Reducing the distance between first deflectable jaw 256-1 and second deflectable jaw 256-2 may reduce the dimensions of axle opening 228 to increase the engagement of the plurality of internal splines 230 with the plurality of external splines 218. Increasing the engagement between first deflectable jaw 256-1 and second deflectable jaw 256-2 may decrease the likelihood that crank arm 208 can withdraw from axle 210. For example, increasing the engagement between first deflectable jaw 256-1 and second deflectable jaw 256-2 may result in each internal spline 230 contacting two adjacent external splines 218. In some embodiments, once fastener 240 is positioned in bore 238 with at least a portion of shank 244 positioned in recess 222 inward of axle major radius 220-1 and advanced to engage threads 252 to deflect first deflectable jaw 256-1 and second deflectable jaw 256-2, removal of crank arm 208 from axle end 214 may be possible only after removing fastener 240 from bore 238 and prying or otherwise increasing the distance S between first deflectable jaw 256-1 and second deflectable jaw 256-2.

Once fastener 240 is positioned in bore 238, fastener 240 may be advanced to engage fastener threads on shank 244 with threads 252 in a second portion 238B of bore 238 or on a nut (not shown) to resist removal of fastener 240 from bore 238. Engagement of threads on shank 244 with threads 252 in a second portion 238B of bore 238 (or on a nut) ensures fastener 240 is maintained with at least a portion of shank 244 resisting or preventing withdrawal of crank arm 208 from axle end 214. Additionally, if fastener 240 is maintained in bore 238 such that at least a portion of shank 244 is positioned in recess 222, fastener 240 may be able to transfer torque from crank arm 208 to axle end 214. Thus, even if external splines 218 or internal splines 230 wear out, fastener 240 may be capable of transferring some torque such that a user is able to pedal bicycle 100.

In some embodiments, axle 210 may be hollow or have longitudinal bore 254 formed therein such that a secondary fastener (not shown) may be advanced into axle 210 to further resist removal of crank arm 208 from the axle end 214. In some embodiments, axle 210 may comprise a through-bore extending the entire length of axle 210, wherein a secondary fastener such as a through-bolt (not shown) with a length greater than the length of axle 210 may be positioned in axle 210. A first end of the secondary fastener may have a head for contact with a first crank arm 208 and a second end of the secondary fastener may have threads for engaging a nut in contact with a second crank arm 208. In this configuration, the secondary fastener and fastener 240 must be removed before either crank arm 208 can be withdrawn from axle 210.

Figure 8A:
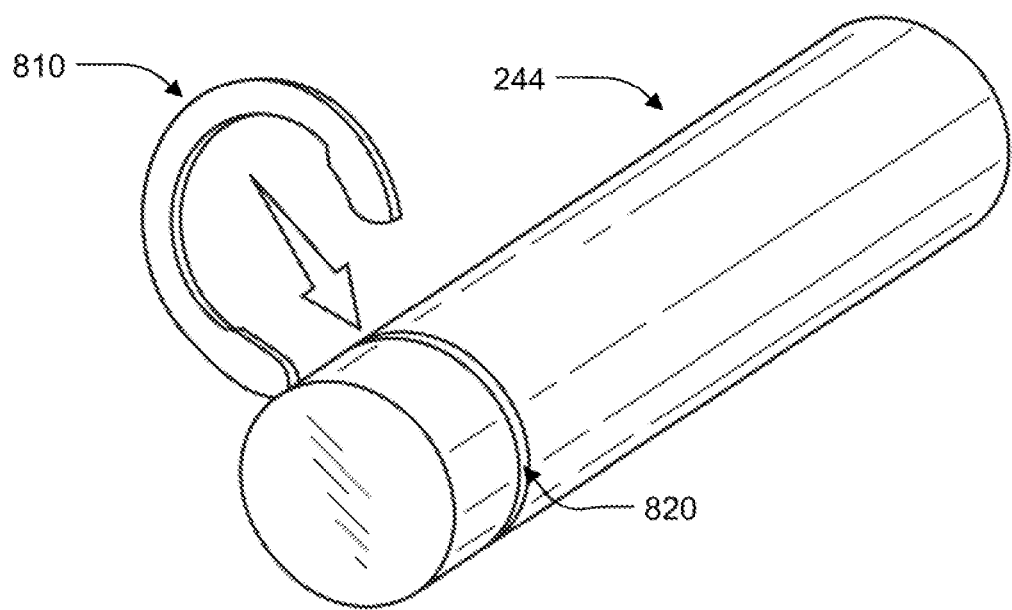
FIG. 8A depicts a perspective close-up view of a retaining clip feature, according to one or more embodiments.

In some embodiments, additional features may be provided to reduce or prevent single point-of-failure issues. In particular embodiments, shank 244 of fastener 240 may be provided with a retaining clip feature 810, as illustrated in FIG. 8A. For instance, a metal snap ring retaining feature may provide additional friction to shank 244 for preventing fastener 240 from falling out of crank arm 208 if fastener 240 were to loosen within bore threads 252. In particular embodiments, shank 244 of fastener 240 may be provided with a groove 820 corresponding to a retaining clip feature 810, as illustrated in FIG. 8A. For instance, a groove 820 may interlock with a retaining clip feature 810 to provide additional resistance force provided than by friction alone, for preventing fastener 240 from falling out of crank arm 208 if fastener 240 were to loosen within bore threads 252.

Figure 8B:
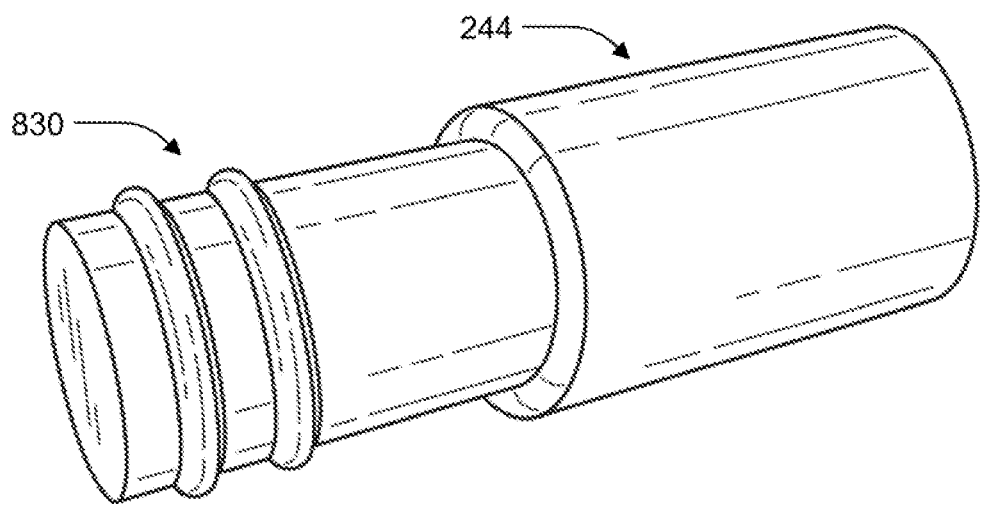
FIG. 8B depicts a perspective close-up view of an O-ring feature, according to one or more embodiments.

In particular embodiments, shank 244 of fastener 240 may be provided with an O-ring feature 830, as illustrated in FIG. 8B. For instance, a rubber O-ring retaining feature may provide additional friction to shank 244 for preventing fastener 240 from falling out of crank arm 208 if fastener 240 were to loosen within bore threads 252. For instance, a rubber O-ring retaining 830 feature may receive a reaction force from the wall of recess 222 to prevent fastener 240 from falling out of crank arm 208.

In particular embodiments, a visual indicator feature (not shown) that connects to both ends of fastener 240 may be provided for visually indicating the presence and/or fastened status of fastener 240 to operational and maintenance staff. In particular embodiments, a visual indicator may clip on or snap on to the ends of fastener 240. In particular embodiments, a visual indicator may be made of a flexible and durable material, such as plastic. In particular embodiments, a visual indicator may be designed for high visibility, such as being made of a highly visible color, to attract the attention of operational and maintenance staff. In particular embodiments, the use of a visual indicator as disclosed may not be limited to use in micromobility vehicles.

In particular embodiments, a bottom bracket assembly 200 of a micromobility vehicle may incorporate a torque sensor or a cadence sensor.

Figure 9:
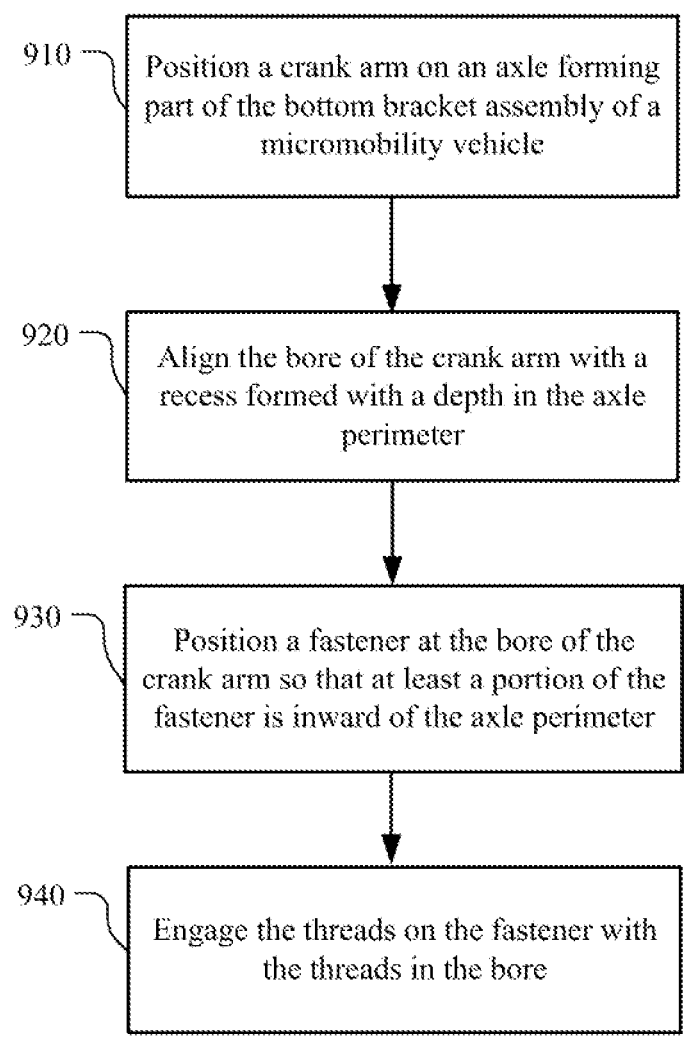
FIG. 9 illustrates a method for connecting a crank arm with a bottom bracket assembly for a micromobility vehicle.

FIG. 9 illustrates a method for connecting a crank arm 208 with bottom bracket assembly 200 for a micromobility vehicle. In a first step 910, a crank arm 208 is positioned on an axle 210 forming part of the bottom bracket assembly 200 of a micromobility vehicle, such as bicycle 100. In a second step 920, a bore 238 of the crank arm 208 is aligned with a recess 222 formed with a depth D in the axle perimeter. In a third step 930, a fastener 240 is positioned at the bore 238 of the crank arm 208 so that at least a portion of the fastener 240 is inward of the axle perimeter. In a fourth step 940, the threads on fastener 240 are engaged with the threads 252 in the bore 238.

Figure 10:
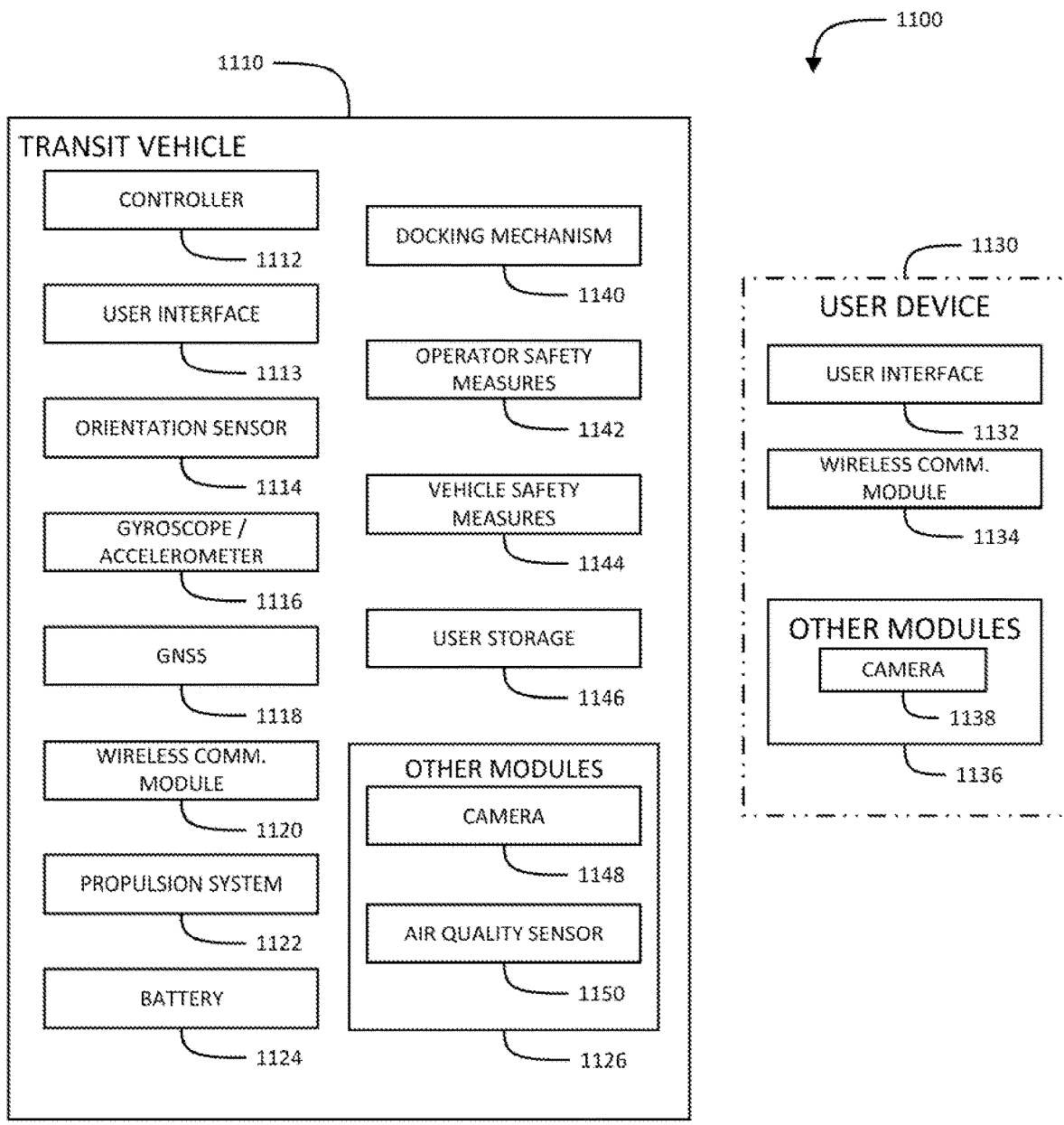
FIG. 10 illustrates a block diagram of a portion of a dynamic transportation matching system including a transit vehicle.

FIG. 10 illustrates a block diagram of a portion of a dynamic transportation matching system 1100 including a transit vehicle 1110. In the embodiment shown in FIG. 10, system 1100 may include transit vehicle 1110 and an optional user device 1130. In general, transit vehicle 1110 may be a passenger vehicle designed to transport a single person (e.g., a mobility transit vehicle, a transit bike and scooter vehicle, or the like) or a group of people (e.g., a typical car or truck). Transit vehicle 1110 may be implemented as a motorized or electric kick scooter, bicycle, and/or motor scooter designed to transport one or more people at once typically on a paved road (collectively, mobility transit vehicles). Transit vehicle 1110 may be implemented as an automobile configured to transport up to 4, 7, 10, or more people at once, or according to a variety of different transportation modalities (e.g., transportation mechanisms). Transit vehicles similar to transit vehicle 1110 may be owned, managed, and/or serviced primarily by a fleet manager/servicer providing transit vehicle 1110 for use by the public as one or more types of transportation modalities offered by a dynamic transportation matching system, for example. In some embodiments, transit vehicles similar to transit vehicle 1110 may be owned, managed, and/or serviced by a private owner using the dynamic transportation matching system to match their vehicle to a transportation request, such as with ridesharing or ride-sourcing applications typically executed on a mobile user device, such as user device 1130 as described herein. User device 1130 may be a smartphone, tablet, near field communication (NFC) or radio-frequency identification (RFID) enabled smart card, or other personal or portable computing and/or communication device that may be used to facilitate rental and/or operation of transit vehicle 1110.

As shown in FIG. 10, transit vehicle 1110 may include one or more of a controller 1112, a user interface 1113, an orientation sensor 1114, a gyroscope/accelerometer 1116, a global navigation satellite system (GNSS) receiver 1118, a wireless communications module 1120, a camera 1148, a propulsion system 1122, an air quality sensor 1150, and other modules 1126. Operation of transit vehicle 1110 may be substantially manual, autonomous, and/or partially or completely controlled by user device 1130, which may include one or more of a user interface 1132, a wireless communications module 1134, a camera 1138, and other modules 1136. In other embodiments, transit vehicle 1110 may include any one or more of the elements of user device 1130. In some embodiments, one or more of the elements of system 1100 may be implemented in a combined housing or structure that can be coupled to or within transit vehicle 1110 and/or held or carried by a user of system 1100.

Controller 1112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 1110 and/or other elements of system 1100, for example. Such software instructions may also implement methods for processing images such as those provided by camera 1148, and/or other sensor signals or data, determining sensor information, providing user feedback (e.g., through user interface 1113 or 1132), querying devices for operational parameters, selecting operational parameters for devices, or performing any of the various operations described herein (e.g., operations performed by logic devices of various devices of system 1100).

In addition, a non-transitory medium may be provided for storing machine readable instructions for loading into and execution by controller 1112. In these and other embodiments, controller 1112 may be implemented with other components where appropriate, such as volatile memory, non-volatile memory, one or more interfaces, and/or various analog and/or digital components for interfacing with devices of system 1100. For example, controller 1112 may be adapted to store sensor signals, sensor information, parameters for coordinate frame transformations, calibration parameters, sets of calibration points, and/or other operational parameters, over time, for example, and provide such stored data to a user via user interface 1113 or 1132. In some embodiments, controller 1112 may be integrated with one or more other elements of transit vehicle 1110, for example, or distributed as multiple logic devices within transit vehicle 1110 and/or user device 1130.

In some embodiments, controller 1112 may be configured to substantially continuously monitor and/or store the status of and/or sensor data provided by one or more elements of transit vehicle 1110 and/or user device 1130, such as the position and/or orientation of transit vehicle 1110 and/or user device 1130, for example, and the status of a communication link established between transit vehicle 1110 and/or user device 1130. Such communication links may be established and then provide for transmission of data between elements of system 1100 substantially continuously throughout operation of system 1100, where such data includes various types of sensor data, control parameters, and/or other data.

User interface 1113 of transit vehicle 1110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 1113 may be adapted to provide user input (e.g., as a type of signal and/or sensor information transmitted by wireless communications module 1134 of user device 1130) to other devices of system 1100, such as controller 1112. User interface 1113 may also be implemented with one or more logic devices (e.g., similar to controller 1112) that may be adapted to store and/or execute instructions, such as software instructions, implementing any of the various processes and/or methods described herein. For example, user interface 1113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 1113 may be adapted to display a time series of various sensor information and/or other parameters as part of or overlaid on a graph or map, which may be referenced to a position and/or orientation of transit vehicle 1110 and/or other elements of system 1100. For example, user interface 1113 may be adapted to display a time series of positions, headings, and/or orientations of transit vehicle 1110 and/or other elements of system 1100 overlaid on a geographical map, which may include one or more graphs indicating a corresponding time series of actuator control signals, sensor information, and/or other sensor and/or control signals. In some embodiments, user interface 1113 may be adapted to accept user input including a user-defined target heading, waypoint, route, and/or orientation, for example, and to generate control signals to cause transit vehicle 1110 to move according to the target heading, route, and/or orientation. In other embodiments, user interface 1113 may be adapted to accept user input modifying a control loop parameter of controller 1112, for example.

Orientation sensor 1114 may be implemented as one or more of a compass, float, accelerometer, and/or other device capable of measuring an orientation of transit vehicle 1110 (e.g., magnitude and direction of roll, pitch, and/or yaw, relative to one or more reference orientations such as gravity and/or Magnetic North), camera 1148, and/or other elements of system 1100, and providing such measurements as sensor signals and/or data that may be communicated to various devices of system 1100. Gyroscope/accelerometer 1116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 1110 and/or other elements of system 1100 and providing such measurements as sensor signals and/or data that may be communicated to other devices of system 1100 (e.g., user interface 1132, controller 1112).

GNSS receiver 1118 may be implemented according to any global navigation satellite system, including a GPS, GLONASS, and/or Galileo based receiver and/or other device capable of determining absolute and/or relative position of transit vehicle 1110 (e.g., or an element of transit vehicle 1110) based on wireless signals received from spaceborn and/or terrestrial sources (e.g., eLoran, and/or other at least partially terrestrial systems), for example, and capable of providing such measurements as sensor signals and/or data (e.g., coordinates) that may be communicated to various devices of system 1100. In some embodiments, GNSS receiver 1118 may include an altimeter, for example, or may be used to provide an absolute altitude.

Wireless communications module 1120 may be implemented as any wireless communications module configured to transmit and receive analog and/or digital signals between elements of system 1100. For example, wireless communications module 1120 may be configured to directly or indirectly receive control signals and/or data from user device 1130 and provide them to controller 1112 and/or propulsion system 1122. In other embodiments, wireless communications module 1120 may be configured to receive images and/or other sensor information (e.g., still images or video images) and relay the sensor data to controller 1112 and/or user device 1130. In some embodiments, wireless communications module 1120 may be configured to support spread spectrum transmissions, for example, and/or multiple simultaneous communications channels between elements of system 1100. Wireless communication links formed by wireless communications module 1120 may include one or more analog and/or digital radio communication links, such as WiFi, Bluetooth, NFC, RFID, LTE, and others, as described herein, and may be direct communication links established between elements of system 1100, for example, or may be relayed through one or more wireless relay stations configured to receive and retransmit wireless communications. In various embodiments, wireless communications module 1120 may be configured to support wireless mesh networking, as described herein.

In some embodiments, wireless communications module 1120 may be configured to be physically coupled to transit vehicle 1110 and to monitor the status of a communication link directly or indirectly established between transit vehicle 1110 and/or user device 1130. Such status information may be provided to controller 1112, for example, or transmitted to other elements of system 1100 for monitoring, storage, or further processing, as described herein. In addition, wireless communications module 1120 may be configured to determine a range to another device, such as based on time of flight, and provide such range to the other device and/or controller 1112. Communication links established by communication module 1120 may be configured to transmit data between elements of system 1100 substantially continuously throughout operation of system 1100, where such data includes various types of sensor data, control parameters, and/or other data, as described herein.

Propulsion system 1122 may be implemented as one or more motor-based propulsion systems, and/or other types of propulsion systems that can be used to provide motive force to transit vehicle 1110 and/or to steer transit vehicle 1110. In some embodiments, propulsion system 1122 may include elements that can be controlled (e.g., by controller 1112 and/or user interface 1113) to provide motion for transit vehicle 1110 and to provide an orientation for transit vehicle 1110. In various embodiments, propulsion system 1122 may be implemented with a portable power supply, such as a battery. In some embodiments, propulsion system 1122 may be implemented with a combustion engine/generator and fuel supply.

For example, in some embodiments, such as when propulsion system 1122 is implemented by an electric motor (e.g., as with many mobility transit vehicles), transit vehicle 1110 may include battery 1124. Battery 1124 may be implemented by one or more battery cells (e.g., lithium ion battery cells) and be configured to provide electrical power to propulsion system 1122 to propel transit vehicle 1110, for example, as well as to various other elements of system 1100, including controller 1112, user interface 1113, and/or wireless communications module 1120. In some embodiments, battery 1124 may be implemented with its own safety measures, such as thermal interlocks and a fire-resistant enclosure, for example, and may include one or more logic devices, sensors, and/or a display to monitor and provide visual feedback of a charge status of battery 1124 (e.g., a charge percentage, a low charge indicator, etc.).

Other modules 1126 may include other and/or additional sensors, actuators, communications modules/nodes, and/or user interface devices, for example, and may be used to provide additional environmental information related to operation of transit vehicle 1110, for example. In some embodiments, other modules 1126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 1100 (e.g., controller 1112) to provide operational control of transit vehicle 1110 and/or system 1100. In further embodiments, other modules 1126 may include a light, such as a headlight or indicator light, and/or an audible alarm, both of which may be activated to alert passersby to possible theft, abandonment, and/or other critical statuses of transit vehicle 1110. In particular, and as shown in FIG. 10, other modules 1126 may include camera 1148 and/or air quality sensor 1150.

Camera 1148 may be implemented as an imaging device including an imaging module including an array of detector elements that can be arranged in a focal plane array. In various embodiments, camera 1148 may include one or more logic devices (e.g., similar to controller 1112) that can be configured to process imagery captured by detector elements of camera 1148 before providing the imagery to communications module 1120 or other elements of the system 1100. More generally, camera 1148 may be configured to perform any of the operations or methods described herein, at least in part, or in combination with controller 1112 and/or user interface 1113 or 1132. In some embodiments, camera 1148 may be a visible light imager and/or thermal imager.

In various embodiments, air quality sensor 1150 may be implemented as an air sampling sensor configured to determine an air quality of an environment about transit vehicle 1110 and provide corresponding air quality sensor data. Air quality sensor data provided by air quality sensor 1150 may include particulate count, methane content, ozone content, and/or other air quality sensor data associated with common street level sensitivities and/or health monitoring typical when in a street level environment, such as that experienced when riding on a typical mobility transit vehicle, as described herein.

Transit vehicles implemented as mobility transit vehicles may include a variety of additional features designed to facilitate fleet management and user and environmental safety. For example, as shown in FIG. 10, transit vehicle 1110 may include one or more of docking mechanism 1140, operator safety measures 1142, vehicle security device 1144, and/or user storage 1146, as described in more detail herein by reference to FIGS. 12A-B.

User interface 1132 of user device 1130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 1132 may be adapted to provide user input (e.g., as a type of signal and/or sensor information transmitted by wireless communications module 1134 of user device 1130) to other devices of system 1100, such as controller 1112. User interface 1132 may also be implemented with one or more logic devices (e.g., similar to controller 1112) that may be adapted to store and/or execute instructions, such as software instructions, implementing any of the various processes and/or methods described herein. For example, user interface 1132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 1132 may be adapted to display a time series of various sensor information and/or other parameters as part of or overlaid on a graph or map, which may be referenced to a position and/or orientation of transit vehicle 1110 and/or other elements of system 1100. For example, user interface 1132 may be adapted to display a time series of positions, headings, and/or orientations of transit vehicle 1110 and/or other elements of system 1100 overlaid on a geographical map, which may include one or more graphs indicating a corresponding time series of actuator control signals, sensor information, and/or other sensor and/or control signals. In some embodiments, user interface 1132 may be adapted to accept user input including a user-defined target heading, waypoint, route, and/or orientation, for example, and to generate control signals to cause transit vehicle 1110 to move according to the target heading, route, and/or orientation. In other embodiments, user interface 1132 may be adapted to accept user input modifying a control loop parameter of controller 1112, for example.

Wireless communications module 1134 may be implemented as any wireless communications module configured to transmit and receive analog and/or digital signals between elements of system 1100. For example, wireless communications module 1134 may be configured to directly or indirectly transmit control signals from user interface 1132 to wireless communications module 1120 or 1134. In some embodiments, wireless communications module 1134 may be configured to support spread spectrum transmissions, for example, and/or multiple simultaneous communications channels between elements of system 1100. In various embodiments, wireless communications module 1134 may be configured to monitor the status of a communication link established between user device 1130 and/or transit vehicle 1110 (e.g., including packet loss of transmitted and received data between elements of system 1100, such as with digital communication links), and/or determine a range to another device, as described herein. Such status information may be provided to user interface 1132, for example, or transmitted to other elements of system 1100 for monitoring, storage, or further processing, as described herein. In various embodiments, wireless communications module 1134 may be configured to support wireless mesh networking, as described herein.

Other modules 1136 of user device 1130 may include other and/or additional sensors, actuators, communications modules/nodes, and/or user interface devices used to provide additional environmental information associated with user device 1130, for example. In some embodiments, other modules 1136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 1100 (e.g., controller 1112) to provide operational control of transit vehicle 1110 and/or system 1100 or to process sensor data to compensate for environmental conditions. As shown in FIG. 10, other modules 1136 may include camera 1138.

Camera 1138 may be implemented as an imaging device including an imaging module including an array of detector elements that can be arranged in a focal plane array. In various embodiments, camera 1138 may include one or more logic devices (e.g., similar to controller 1112) that can be configured to process imagery captured by detector elements of camera 1138 before providing the imagery to communications module 1120. More generally, camera 1138 may be configured to perform any of the operations or methods described herein, at least in part, or in combination with controller 1138 and/or user interface 1113 or 1132.

In general, each of the elements of system 1100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 1100.

In addition, one or more non-transitory mediums may be provided for storing machine readable instructions for loading into and execution by any logic device implemented with one or more of the devices of system 1100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 11149.1 standard test access port and boundary-scan architecture), and/or other interfaces, such as an interface for one or more antennas, or an interface for a particular type of sensor).

Sensor signals, control signals, and other signals may be communicated among elements of system 1100 and/or elements of other systems similar to system 1100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 1100 may include one or more modules supporting wired, wireless, and/or a combination of wired and wireless communication techniques, including wireless mesh networking techniques. In some embodiments, various elements or portions of elements of system 1100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 1100 may include one or more batteries, capacitors, or other electrical power storage devices, for example, and may include one or more solar cell modules or other electrical power generating devices. In some embodiments, one or more of the devices may be powered by a power source for transit vehicle 1110, using one or more power leads. Such power leads may also be used to support one or more communication techniques between elements of system 1100

Figure 11:
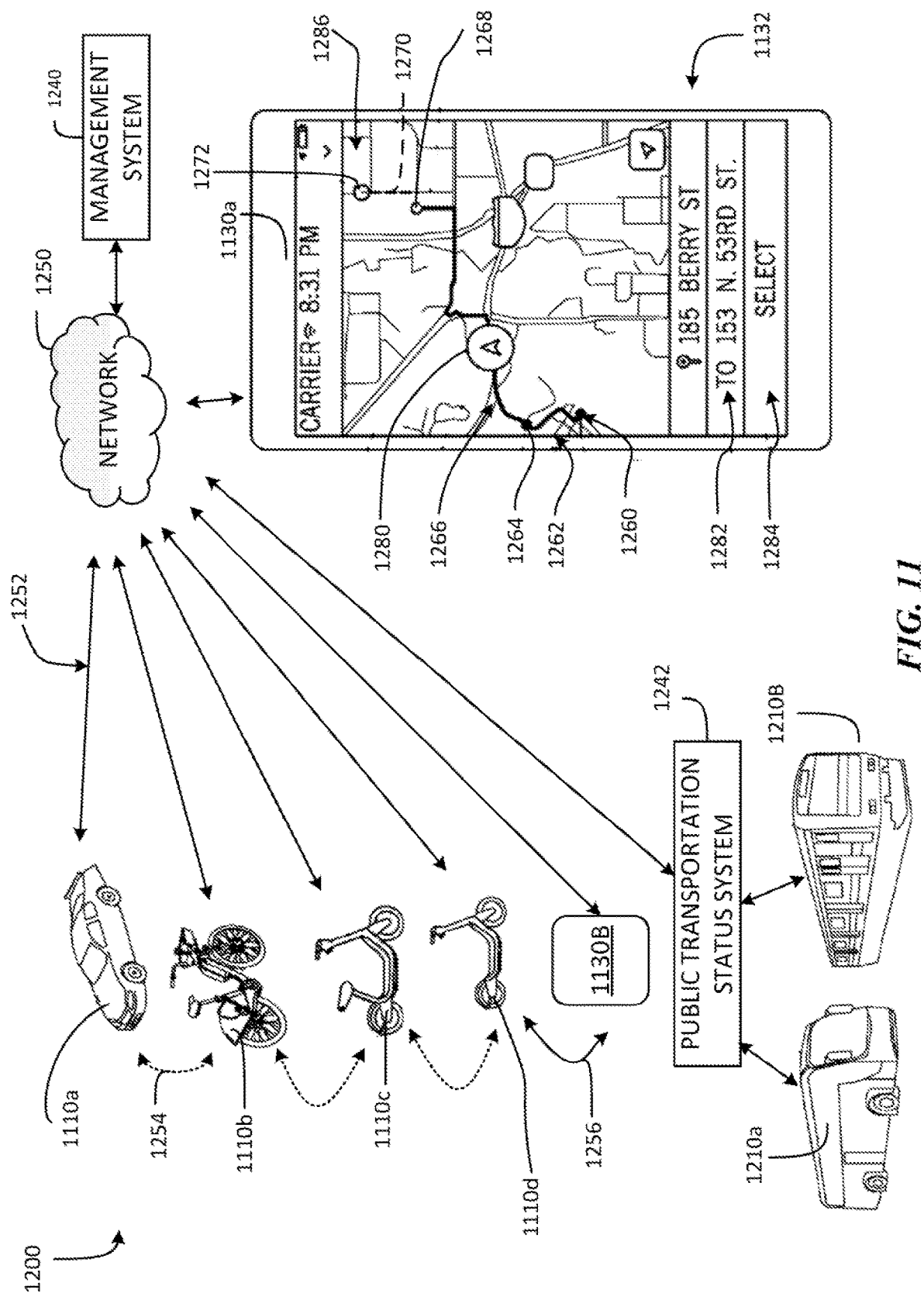
FIG. 11 illustrates a block diagram of a dynamic transportation matching system incorporating a variety of transportation modalities.

FIG. 11 illustrates a diagram of a dynamic transportation matching system 1200 incorporating a variety of transportation modalities. For example, as shown in FIG. 11, dynamic transportation matching system 1200 may include multiple embodiments of system 1100. In the embodiment shown in FIG. 11, dynamic transportation matching system 1200 includes a management system/server 1240 in communication with a number of transit vehicles 1110a-d and user devices 1130a-b over a combination of a typical wide area network (WAN) 1250, WAN communication links 1252 (solid lines), a variety of mesh network communication links 1254 (curved dashed lines), and NFC, RFID, and/or other local communication links 1256 (curved solid lines). Dynamic transportation matching system 1200 also includes a public transportation status system 1242 in communication with a variety of public transportation vehicles, including one or more buses 1210a, trains 1210b, and/or other public transportation modalities, such as ships, ferries, light rail, subways, streetcars, trolleys, cable cars, monorails, tramways, and aircraft. As shown in FIG. 11, all transit vehicles are able to communicate directly to WAN 1250 and, in some embodiments, may be able to communicate across mesh network communication links 1254, to convey fleet data and/or fleet status data amongst themselves and/or to and from management system 1240.

In FIG. 11, user device 1130a may receive an input with a request for transportation with one or more transit vehicles 1110a-d and/or public transportation vehicles 1210a-b. For example, the transportation request may be a request to use (e.g., hire or rent) one of transit vehicles 1110a-d. The transportation request may be transmitted to management system 1240 over WAN 1250, allowing management system 1240 to poll status of transit vehicles 1110a-d and to select one of transit vehicles 1110a-d to fulfill the transportation request. Upon or after one of the transit vehicles 1110a-d is selected to fulfill the transportation request, a fulfillment notice from management system 1240 and/or from the selected transit vehicle 1110a-d may be transmitted to the user device 1130a. In some embodiments, navigation instructions to proceed to or otherwise meet with the selected transit vehicle 1110a-d may be sent to the user device 1130a. A similar process may occur using user device 1130b, but where the transportation request enables a transit vehicle over a local communication link 1256, as shown.

Management system 1240 may be implemented as a server with controllers, user interfaces, communications modules, and/or other elements similar to those described with respect to system 1100 of FIG. 10, but with sufficient processing and storage resources to manage operation of dynamic transportation matching system 1200, including monitoring statuses of transit vehicles 1110a-d, as described herein. In some embodiments, management system 1240 may be implemented in a distributed fashion and include multiple separate server embodiments linked communicatively to each other direction and/or through WAN 1250. WAN 1250 may include one or more of the Internet, a cellular network, and/or other wired or wireless WANs. WAN communication links 1252 may be wired or wireless WAN communication links, and mesh network communication links 1254 may be wireless communication links between and among transit vehicles 1110a-d, as described herein.

User device 1130a in FIG. 11 includes a display of user interface 1132 that shows a planned route for a user attempting to travel from an origination point 1260 to a destination 1272 using different transportation modalities (e.g., a planned multimodal route), as depicted in a route/street map 1286 rendered by user interface 1132. For example, management system 1240 may be configured to monitor statuses of all available transportation modalities (e.g., including transit vehicles and public transportation vehicles) and provide a planned multimodal route from origination point 1260 to destination 1272. Such a planned multimodal route may include, for example, a walking route 1262 from origination point 1260 to a bus stop 1264, a bus route 1266 from bus stop 1264 to a bus stop 1268 (e.g., using one or more of transit vehicles 1210a or 1210b), and a mobility route 1270 (e.g., using one or more of mobility transit vehicles 1110b, 1110c, or 1110d) from bus stop 1268 to destination 1272. Also shown rendered by user interface 1132 are a present location indicator 1280 (indicating a present absolute position of user device 1130a on street map 1286), a navigation destination selector/indicator 1282 (e.g., configured to allow a user to input a desired navigation destination), and a notice window 1284 (e.g., used to render vehicle status data or other information, including user notices and/or alerts, as described herein). For example, a user may use navigation destination selector/indicator 1282 to provide and/or change destination 1272, as well as change any portion (e.g., leg, route, etc.) or modality of the multimodal route from origination point 1260 to destination 1272. In some embodiments, notice window 1284 may display instructions for traveling to a next waypoint along the determined multimodal route (e.g., directions to walk to a bus stop, directions to ride a mobility transit vehicle to a next stop along the route, etc.).

In various embodiments, management system 1240 may be configured to provide or suggest an optimal multimodal route to a user (e.g., initially and/or while traversing a particular planned route), and a user may select or make changes to such a route through manipulation of user device 1130a, as shown. For example, management system 1240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 1200, prior user trips, a desired arrival time and/or departure time (e.g., based on user input or obtained through a user calendar or other data source), available system resources (e.g., availability of one or more transmit modality options), or specifically input or set by a user for the specific route, for example, or in general. In one example, origination point 1260 may be extremely congested or otherwise hard to access by a ride-share transit vehicle, which could prevent or significantly increase a wait time for the user and a total trip time to arrive at destination 1272. In such circumstances, a planned multimodal route may include directing the user to walk and/or take a scooter/bike to an intermediate and less congested location to meet a reserved ride-share vehicle, which would allow the user to arrive at destination 1272 quicker than if the ride-share vehicle was forced to meet the user at origination point 1260. It will be appreciated that numerous different transportation-relevant conditions may exist or dynamically appear or disappear along a planned route that may make it beneficial to use different modes of transportation to arrive at destination 1272 efficiently, including changes in traffic congestion and/or other transportation-relevant conditions that occur mid-route, such as an accident along the planned route. Under such circumstances, management system 1240 may be configured to adjust a modality or portion of the planned route dynamically in order to avoid or otherwise compensate for the changed conditions while the route is being traversed.

Figure 12A:
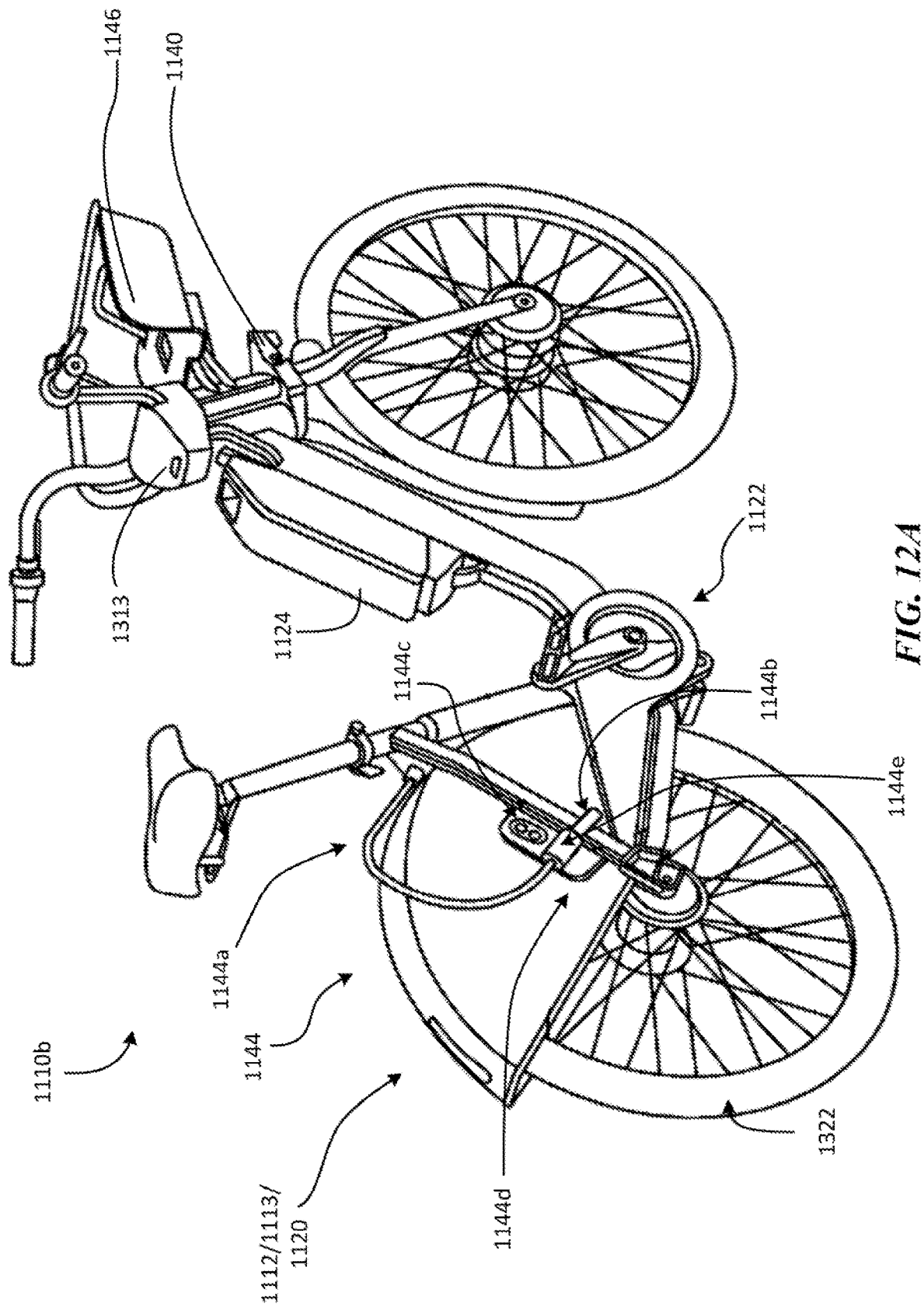
FIG. 12A illustrates a mobility transit vehicle for use in a dynamic transportation matching system.

FIG. 12A illustrates a diagram of mobility transit vehicles 1110b for use in a dynamic transportation matching system. For example, transit vehicle 1110b of FIG. 12A may correspond to a motorized bicycle integrated with the various elements of system 1100 and may be configured to participate in dynamic transportation matching system 1200 of FIG. 11. As shown, transit vehicle 1110b includes controller/user interface/wireless communications module 1112/1113/1120 (e.g., integrated with a rear fender of transit vehicle 1110b), propulsion system 1122 configured to provide motive power to at least one of the wheels (e.g., a rear wheel 1322) of transit vehicle 1110b, battery 1124 for powering propulsion system 1122 and/or other elements of transit vehicle 1110b, docking mechanism 1140 (e.g., a spade lock assembly) for docking transit vehicle 1110b at a docking station, user storage 1146 implemented as a handlebar basket, and vehicle security device (e.g., an embodiment of vehicle security device 1144 of FIG. 10), which may incorporate one or more of a locking cable 1144a, a pin 1144b coupled to a free end of locking cable 1144a, a pin latch/insertion point 1144c, a frame mount 1144d, and a cable/pin holster 1144e, as shown (collectively, vehicle security device 1144). In some embodiments, controller/user interface/wireless communications module 1112/1113/1120 may alternatively be integrated on and/or within a handlebar enclosure 1313, as shown.

In some embodiments, vehicle security device 1144 may be implemented as a wheel lock configured to immobilize rear wheel 1322 of transit vehicle 1110b, such as by engaging pin 1144b with spokes of rear wheel 1322. In the embodiment shown in FIG. 12A, vehicle security device 1144 may be implemented as a cable lock configured to engage with a pin latch on a docking station, for example, or to wrap around and/or through a secure pole, fence, or bicycle rack and engage with pin latch 1144c. In various embodiments, vehicle security device 1144 may be configured to immobilize transit vehicle 1110b by default, thereby requiring a user to transmit a request to management system 1240 (e.g., via user device 1130) to reserve transit vehicle 1110b before attempting to use transit vehicle 1110b. The request may identify transit vehicle 1110b based on an identifier (e.g., a QR code, a barcode, a serial number, etc.) presented on transit vehicle 1110b (e.g., such as by user interface 1113 on a rear fender of transit vehicle 1110b). Once the request is approved, management system 1240 may transmit an unlock signal to transit vehicle 1110b (e.g., via network 1250). Upon receiving the unlock signal, transit vehicle 1110b (e.g., controller 1112 of transit vehicle 1110b) may release vehicle security device 1144 and unlock rear wheel 1322 of transit vehicle 1110b.

Figure 12B:
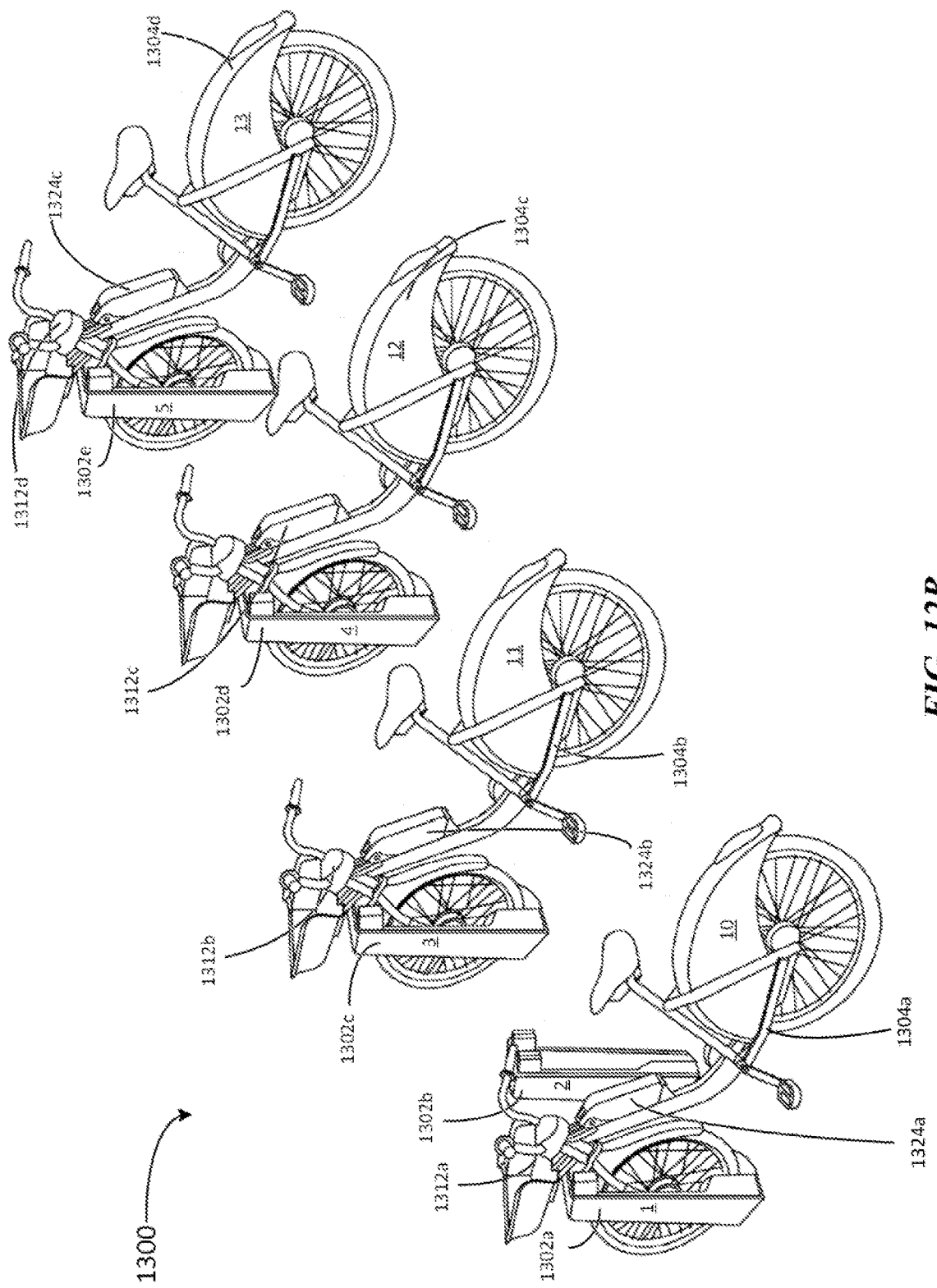
FIG. 12B illustrates a diagram of a docking station for docking one or more mobility transit vehicles.

FIG. 12B illustrates a diagram of a docking station 1300 for docking one or more mobility transit vehicles. As shown, docking station 1300 may include multiple bicycle docks, such as docks 1302a-e. In this example, a single transit vehicle (e.g., any one of electric bicycles 1304a-d) may dock in each of the docks 1302a-e of the docking station 1300. Each of the docks 1302a-e may include a lock mechanism for receiving and locking docking mechanism 1140 of the electric bicycles 1304a-d. In some embodiments, once a transit vehicle is docked in a bicycle dock, the dock may be electronically coupled to the transit vehicle (e.g., controllers 1312a-d of the transit vehicle) via a link such that the transit vehicle and the dock may communicate with each other via the link.

A user may use a user device (e.g., user device 1130) to use a mobility transit vehicle 1110b-d that is docked in one of the bicycle docks 1302a-e by transmitting a request to management system 1240. Once the request is processed, management system 1240 may transmit an unlock signal to a mobility transit vehicle 1110b-d docked in the dock and/or the dock via network 1250. The docking station 1300 may automatically unlock the lock mechanism to release the mobility transit vehicle 1110b-d based on the unlock signal. In some embodiments, each of the docks 1302a-e may also be configured to charge batteries (e.g., batteries 1324a-c) of the electric bicycle 1304a-d, respectively, when the electric bicycle 1304a-d are docked at the docks 1302a-e. In some embodiments, docking station 1300 may also be configured to transmit information associated with the docking station 1300 (e.g., a number of transit vehicles docked at the docking station 1300, charge statuses of the docked transit vehicles, a time when a transit vehicle is docked or undocked from the docking station 1300, detected nearby but undocked transit vehicles, etc.) to the management system 1240.

What is claimed is:

1. A bottom bracket assembly for a micromobility vehicle, the bottom bracket assembly comprising:
   an axle rotatable around a longitudinal axis, an end of the axle comprising:
      a plurality of angled surfaces, the plurality of angled surfaces defining an axle perimeter; and
      at least two recesses formed in at least a portion of the axle perimeter, the at least two recesses being separated from each other along a longitudinal direction of the axle;
   a crank arm comprising:
      an axle opening formed at a first end of the crank arm, the axle opening comprising a base surface defining an axle opening base perimeter greater than the axle perimeter for positioning the crank arm on the axle; and
      at least two bores each formed at an angle relative to the axle opening, each bore having a radius which intersects at least the axle opening base perimeter and the axle perimeter, wherein the at least two bores are respectively aligned with the at least two recesses when the crank arm is positioned on the axle; and
   at least two fasteners respectively associated with the at least two bores, each fastener having a radius less than the radius of the associated bore such that at least a portion of the radius of each fastener is positioned radially inward of the axle perimeter when the at least two fasteners are respectively positioned in the at least two bores so as to resist withdrawal of the crank arm from the axle.

2. The bottom bracket assembly of claim 1, wherein:
   the first end of the crank arm further comprises a slot joined with the axle opening;
   the slot and the axle opening divide the first end of the crank arm into a first deflectable jaw and a second deflectable jaw; and
   each bore comprises:
      a first portion formed in one of the first deflectable jaw or the second deflectable jaw; and
      a second portion formed in a remaining one of the first deflectable jaw or the second deflectable jaw; and each fastener has a length longer than the slot between the first deflectable jaw and the second deflectable jaw, wherein respective advancement of the at least two fasteners in the at least two bores narrows the slot between the first deflectable jaw and the second deflectable jaw to increase engagement of the plurality of angled surfaces via the base surface so as to resist withdrawal of the crank arm from the axle.

3. The bottom bracket assembly of claim 2, wherein:
each fastener comprises threads;
the second portion of each bore comprises threads, wherein engagement of the threads in the second portion of each bore via the threads on the associated fastener resists withdrawal of the associated fastener from the crank arm, and
advancement of the threads on each fastener in the second portion of the associated bore narrows the slot between the first deflectable jaw and the second deflectable jaw so as to resist withdrawal of the crank arm from the axle.

4. The bottom bracket assembly of claim 1, wherein:
the plurality of angled surface comprises a plurality of external splines;
the plurality of external splines defines an axle major radius, an axle minor radius, and an axle pitch radius;
the axle opening base surface comprises a plurality of internal splines extending radially inward from the axle opening base surface for engaging the plurality of external splines;
the plurality of internal splines defines an axle opening major radius, an axle opening minor radius, and an axle opening pitch radius;
each of the axle opening major radius, the axle opening minor radius, and the axle opening pitch radius is less than the axle major radius; and
each recess is formed with a depth through at least the axle major radius.

5. The bottom bracket assembly of claim 4, wherein:
the axle opening minor radius is greater than the axle minor radius;
the depth of each recess is further formed through the axle pitch radius; and
the plurality of internal splines engages the plurality of external splines when the at least two fasteners are respectively fastened to the at least two bores so as to further resist withdrawal of the crank arm from the axle.

6. The bottom bracket assembly of claim 4, wherein:
the axle opening minor radius is greater than the axle pitch radius;
the depth of each recess is further formed through the axle major radius; and
the plurality of internal splines engages the plurality of external splines when the at least two fasteners are respectively fastened to the at least two bores so as to further resist withdrawal of the crank arm from the axle.

7. The bottom bracket assembly of claim 1, wherein each recess is curved and has a recess radius of curvature, wherein the radius of each fastener is less than the recess radius of curvature of the recess aligned with the associated bore.

8. The bottom bracket assembly of claim 1, wherein:
the at least two fasteners are respectively positioned in the at least two bores from opposite directions.

9. A micromobility vehicle, comprising:
a frame;
two wheels rotatably coupled to the frame; and
a bottom bracket assembly located in the frame, the bottom bracket assembly comprising:
an axle rotatable around a longitudinal axis, each end of the axle comprising:
a plurality of angled surfaces, the plurality of angled surfaces defining an axle perimeter; and
a recess formed in at least a portion of the axle perimeter;
a pair of crank arms respectively associated with each end of the axle, each crank arm comprising:
an axle opening formed at a first end of the crank arm, the axle opening comprising a base surface defining an axle opening base perimeter greater than the axle perimeter for positioning the crank arm on the axle; and
a bore formed at an angle orthogonal to the axle opening, the bore having a radius which intersects at least the axle opening base perimeter and the axle perimeter, wherein the bore is aligned with the recess when the crank arm is positioned on the axle; and
a fastener configured to be positioned in the bore, the fastener having a radius less than the radius of the bore such that at least a portion of the radius of the fastener is positioned radially inward of the axle perimeter along the recess when the fastener is positioned in the bore so as to resist withdrawal of the crank arm from the axle,
wherein at each end of the axle:
the plurality of angled surfaces comprises a plurality of external splines;
the plurality of external splines defines an axle major radius, an axle minor radius, and an axle pitch radius; and
the recess is formed with a depth through at least the axle major radius.

10. The micromobility vehicle of claim 9, wherein in each crank arm:
the first end of the crank arm further comprises a slot joined with the axle opening;
the slot and the axle opening divide the first end of the crank arm into a first deflectable jaw and a second deflectable jaw; and
the bore comprises:
a first portion formed in one of the first deflectable jaw or the second deflectable jaw; and
a second portion formed in a remaining one of the first deflectable jaw or the second deflectable jaw; and
the fastener has a length longer than the slot between the first deflectable jaw and the second deflectable jaw, wherein advancement of the fastener in the bore connects the first deflectable jaw with the second deflectable jaw so as to resist withdrawal of the crank arm from the axle.

11. The micromobility vehicle of claim 10, wherein in each crank arm:
the fastener comprises threads;
the second portion of the bore comprises threads, wherein engagement of the threads in the second portion of the bore via the threads on the fastener resists withdrawal of the fastener from the crank arm, and
further advancement of the threads on the fastener in the second portion of the bore narrows the slot between the first deflectable jaw and the second deflectable jaw so as to resist withdrawal of the crank arm from the axle.

12. The micromobility vehicle of claim 9, wherein in each crank arm:
the axle opening base surface comprises a plurality of internal splines extending radially inward from the axle opening base surface for engaging the plurality of external splines;
the plurality of internal splines defines an axle opening major radius, an axle opening minor radius, and an axle opening pitch radius; and
each of the axle opening major radius, the axle opening minor radius, and the axle opening pitch radius is less than the axle major radius.

13. The micromobility vehicle of claim 12, wherein in each crank arm:
the axle opening minor radius is greater than the axle minor radius;
the depth of the recess of the associated end of the axle is further formed through the axle pitch radius; and
the plurality of internal splines engages the plurality of external splines of the associated end of the axle when the fastener is positioned in the bore so as to further resist withdrawal of the crank arm from the axle.

14. The micromobility vehicle of claim 12, wherein in each crank arm:
the axle opening minor radius is greater than the axle pitch radius;
the depth of the recess of the associated end of the axle is further formed through the axle major radius; and
the plurality of internal splines engages the plurality of external splines of the associated end of the axle when the fastener is positioned in the bore so as to further resist withdrawal of the crank arm from the axle.

15. The micromobility vehicle of claim 9, wherein the axle comprises:
a through-bore formed along the longitudinal axis from a first end of the axle to a second end of the axle;
a through-bolt configured to be inserted in the through-bore, the through-bolt having a head on a first end of the through-bolt and threads on a second end of the through-bolt; and
an axle nut having internal threads for engaging the threads on the second end of the through-bolt, wherein engagement of the threads on the axle nut with the threads on the second end of the through-bolt further resists withdrawal of each crank arm from the axle.

16. The micromobility vehicle of claim 9, wherein at each end of the axle, the recess is curved and has a recess radius of curvature, wherein the radius of the fastener is less than the recess radius of curvature.

17. A method for interconnecting a bottom bracket assembly for a micromobility vehicle having a frame and a bottom bracket mounted in the frame, the method comprising:
positioning a crank arm on an axle forming part of the bottom bracket, wherein:
the axle comprises:
a plurality of angled surfaces defining an axle perimeter; and
at least two recesses formed in at least a portion of the axle perimeter, the at least two recesses being separated from each other along a longitudinal direction of the axle;
the crank arm comprises:
an axle opening formed at a first end of the crank arm, the axle opening comprising an internal surface defining an axle opening base perimeter; and
at least two bores each formed at an angle orthogonal to the axle opening, each bore having a radius which intersects at least the axle opening base perimeter; and
respectively aligning the at least two bores with the at least two recesses; and
respectively positioning at least two fasteners in the at least two bores, wherein at least a portion of each fastener is positioned radially inward of the axle perimeter.

18. The method of claim 17, wherein:
the first end of the crank arm further comprises a slot joined with the axle opening;
the slot and the axle opening divide the first end of the crank arm into a first deflectable jaw and a second deflectable jaw; and
each bore comprises:
a first portion formed in one of the first deflectable jaw or the second deflectable jaw; and
a second portion formed in a remaining one of the first deflectable jaw or the second deflectable jaw; and
each fastener has a length longer than the slot between the first deflectable jaw and the second deflectable jaw, wherein respectively advancing the at least two fasteners in the at least two bores narrows the slot between the first deflectable jaw and the second deflectable jaw to increase engagement of the plurality of angled surfaces via the internal surface so as to resist withdrawal of the crank arm from the axle.

19. The method of claim 17, wherein:
the plurality of angled surface comprises a plurality of external splines;
the plurality of external splines defines an axle major radius, an axle minor radius, and an axle pitch radius;
the axle opening base surface comprises a plurality of internal splines extending radially inward from the axle opening base surface for engaging the plurality of external splines;
the plurality of internal splines defines an axle opening major radius, an axle opening minor radius, and an axle opening pitch radius;
each of the axle opening major radius, the axle opening minor radius, and the axle opening pitch radius is less than the axle major radius; and
each recess is formed with a depth through at least the axle major radius.

20. The method of claim 17, wherein:
the at least two fasteners are respectively positioned in the at least two bores from opposite directions.

* * * * *